(12) United States Patent
Li et al.

(10) Patent No.: US 12,021,778 B2
(45) Date of Patent: *Jun. 25, 2024

(54) METHOD AND APPARATUS FOR RECEIVING SIGNAL

(71) Applicant: ZTE CORPORATION, Guangdong (CN)

(72) Inventors: Yong Li, Guangdong (CN); Yu Ngok Li, Guangdong (CN); Yijian Chen, Guangdong (CN); Huahua Xiao, Guangdong (CN); Zhaohua Lu, Guangdong (CN); Jianxing Cai, Guangdong (CN); Hao Wu, Guangdong (CN)

(73) Assignee: ZTE CORPORATION (CN)

( * ) Notice: Subject to any disclaimer, the term of this patent is extended or adjusted under 35 U.S.C. 154(b) by 183 days.

This patent is subject to a terminal disclaimer.

(21) Appl. No.: 17/548,674

(22) Filed: Dec. 13, 2021

(65) Prior Publication Data

US 2022/0103326 A1 Mar. 31, 2022

Related U.S. Application Data

(63) Continuation of application No. 15/762,059, filed as application No. PCT/CN2016/095499 on Aug. 16, 2016, now Pat. No. 11,233,611.

(30) Foreign Application Priority Data

Sep. 25, 2015 (CN) .......................... 201510624664.X

(51) Int. Cl.
*H04L 5/00* (2006.01)
*H04J 13/00* (2011.01)
(Continued)

(52) U.S. Cl.
CPC .......... *H04L 5/0048* (2013.01); *H04J 13/004* (2013.01); *H04L 1/06* (2013.01);
(Continued)

(58) Field of Classification Search
CPC .. H04L 5/0048; H04L 1/06; H04L 5/00; H04J 13/004
(Continued)

(56) References Cited

U.S. PATENT DOCUMENTS

| 2013/0163499 | A1 | 6/2013 | Cheng | |
|---|---|---|---|---|
| 2013/0301447 | A1* | 11/2013 | Gomadam | H04W 24/10 370/252 |
| 2014/0071918 | A1* | 3/2014 | Park | H04W 72/23 370/329 |

FOREIGN PATENT DOCUMENTS

| CN | 101834629 | 9/2010 |
|---|---|---|
| CN | 101841817 | 9/2010 |

(Continued)

OTHER PUBLICATIONS

Huawei, CSI-RS Design for 12 and 16 ports, 5 pages (Year: 2015).*
(Continued)

*Primary Examiner* — Christopher M Crutchfield
*Assistant Examiner* — Jean F Voltaire
(74) *Attorney, Agent, or Firm* — McDonald Hopkins LLC

(57) ABSTRACT

Provided are a method and an apparatus for receiving signal, and a non-transitory computer-readable storage medium. The method comprises that a User Equipment (UE) receives signaling comprising configuration information of a Channel State Information-Reference Signal (CSI-RS); and acquires the configuration information of the CSI-RS from the signaling.

15 Claims, 11 Drawing Sheets

(51) Int. Cl.
  *H04L 1/06* (2006.01)
  *H04B 7/06* (2006.01)
  *H04L 25/02* (2006.01)
(52) U.S. Cl.
  CPC ............... *H04L 5/00* (2013.01); *H04B 7/06* (2013.01); *H04L 25/0224* (2013.01)
(58) Field of Classification Search
  USPC ........................................................ 370/329
  See application file for complete search history.

(56) References Cited

FOREIGN PATENT DOCUMENTS

| | | |
|---|---|---|
| CN | 102195741 | 9/2011 |
| CN | 102237951 | 11/2011 |
| CN | 102315870 | 1/2012 |
| CN | 102378114 | 3/2012 |
| CN | 102480342 | 5/2012 |
| CN | 102638432 | 8/2012 |
| CN | 103314614 | 9/2013 |
| CN | 103763070 | 4/2014 |
| CN | 103763071 | 4/2014 |
| CN | 104125037 | 10/2014 |
| WO | 2012020963 | 2/2012 |

OTHER PUBLICATIONS

Chinese First Office Action and Search Report dated Sep. 17, 2019; Chinese Patent Application No. 20151062466.4X.
Chinese Second Office Action and Extended Search Report dated May 7, 2020; Chinese Patent Application No. 20151062466.4X.
ZTE; "Extension of Non-Precoded CSI-RS for 12 and 16 Ports," 3GPP Draft; R1-155263 Extension of Non-Precoded CSI-RS for 12 and 16 Ports, 3rd Generation Partnership Project (3GPP), Mobile Competence Centre; 650, Route Des Lucioles; F-06921 Sophia-Antipolis Ced, vol. RAN WG1, No. Malmo, Sweden; Oct. 5, 2015-Oct. 9, 2015 Oct. 4, 2015 (Oct. 4, 2015), XPO51002222.
European Office Action dated Oct. 24, 2019; European Patent Application No. 16847947.5.
Huawei et al., "CSI-RS design for 12 and 15 ports," 3GPP Draft; R1-153792, 3rd Generation Partnership Project, Mobile Competence Centre; 650, Route Des Lucioles; F-06921 Sophia-Antipolis Cedex; France, vol. RAN WG1, No. Beijing China Aug. 24, 2015-Aug. 28, 2015; Aug. 23, 2015.
Ericsson: "CSI-RS Design for FD-MIMO," 3GPP Draft; R1-154551 CSI-RS Design for FD-MIMO, 3rd Generation Partnership Project, Mobile Competence Centre; 650, Route Des Lucioles; F-06921 Sophia-Antipolis Cedx, France, vol. RAN WG1, Beijing, China, Aug. 23, 2015, XP051001821.
ZTE: "Discussion on DMRS Enhancement for EBF/FD-MIMO," 3GPP Draft; R1-154385 Discussion on DMRS Enhancement for EBF FD-MIMO, 3GPP, Mobile Competence Centre; 650, Route Res Lucioules; F-06921 Sophia-Antipolis Cedex; F, vol. RAN WG1, Beijing, China; Aug. 23, 2015, XP051001697.
Supplementary European Search Report in European applicaiton No. 16847947.5., dated Nov. 26, 2018.
International Search Report in international application No. PCT/CN2016/095499, dated Nov. 21, 2016.
CSI-RS design for 12 and 16 ports, 3GPP TSG RAN WG1 Meeting #82—R1-153792, Huawei, HiSilicon, dated Aug. 15, 2015.
European Office Action dated May 31, 2023; European Application No. 16 847 947.5.
"3rd Generation Partnership Project; Technical Specification Group Radio Access Network; Evolved Universal Terrestrial Radio Access (E-UTRA): Physical channels and modulation (Release 12", 3GPP Standard; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V12.6.0, Jun. 24, 2015 (Jun. 24, 2015), pp. 1-136, XP050965905.

\* cited by examiner

METHOD AND APPARATUS FOR RECEIVING SIGNAL

CROSS-REFERENCE TO RELATED APPLICATION

This application is a continuation of U.S. Utility application Ser. No. 15/762,059, filed on Mar. 21, 2018, which is a 35 U.S.C. 371 national stage filing of International Patent Application No. PCT/CN2016/095499, filed on Aug. 16, 2016, which claims priority and benefit of Chinese Patent Application No. 201510624664.X filed with the CNIPA on Sep. 25, 2015, disclosures of which are incorporated herein by reference in their entireties.

TECHNICAL FIELD

The disclosure relates to the field of communications, and particularly to a method and apparatus for receiving signal.

BACKGROUND

A Long Term Evolution (LTE)/LTE-Advanced (LTE-A) technology is a mainstream 4th-Generation (4G) mobile communication technology. LTE/LTE-A has the following two duplex manners: Frequency Division Duplex (FDD) and Time Division Duplex (TDD). A frame structure of the FDD manner is referred to as a frame structure type 1, and a frame structure of the TDD manner is referred to as a frame structure type 2.

FIG. 1 is a schematic diagram of a frame structure type 1. As shown in FIG. 1, the description of the frame structure type 1 is provided as follows. Each radio frame has a length of $T_f=307200 \cdot T_s=10$ ms (milliseconds), and consists of 20 slots, and each of the slots has a length of $T_{slot}=15360 \cdot T_s=0.5$ ms (milliseconds) and the slots are numbered from 0 to 19, where $T_s$ is a time unit, and $T_s=1/(15000 \times 2048)$ seconds; a subframe is defined to consist of two continuous slots, that is, a subframe i consists of slots 2i and 2i+1. For the FDD manner, within a 10-millisecond time interval, 10 subframes are configured for downlink transmission, and 10 subframes are configured for uplink transmission; uplink transmission and downlink transmission are performed on different frequencies respectively. In a half-duplex FDD manner, User Equipment (UE) may not implement transmission and reception simultaneously, while in a full-duplex FDD manner, there is no such a limit.

FIG. 2 is a schematic diagram of a frame structure type 2. As shown in FIG. 2, the description of the frame structure type 2 is provided as follows. Each radio frame has a length of $T_f=307200 \cdot T_s=10$ ms, and consists of two half-frames, the half-frames have lengths of $153600 \cdot T_s=5$ ms, each half-frame consists of 5 subframes, each subframe has a length of $30720 \cdot T_s=1$ ms, each subframe is defined to consist of two slots, that is, a subframe i consists of slots 2i and 2i+1, and each of the slots has a length of $T_{slot}=15360 \cdot T_s=0.5$ ms, where $T_s$ is a unit time, and $T_s=1/(15000 \times 2048)$ seconds.

Uplink-downlink configuration of a cell changes among frames, and uplink-downlink transmission occurs in subframes of the frames. Uplink-downlink configuration of a present frame is obtained by high-layer signaling.

There are totally 7 uplink-downlink configurations shown in Table 1. For each subframe in a radio frame, "D" denotes a downlink subframe configured for downlink transmission, "U" denotes an uplink subframe configured for uplink transmission, and "S" denotes a special subframe. The special subframe has the following three regions: a Downlink Pilot Time Slot (DwPTS), a Guard Period (GP) and an Uplink Pilot Time Slot (UpPTS).

TABLE 1

| uplink-downlink configuration | Downlink-to-uplink Switch-point periodicity | Subframe number |
|---|---|---|
| 0 | 5 ms | |
| 1 | 5 ms | |
| 2 | 5 ms | |
| 3 | 10 ms | |
| 4 | 10 ms | |
| 5 | 10 ms | |
| 6 | 5 ms | |

LTE/LTE-A technology-based downlink transmission uses an Orthogonal Frequency Division Multiplexing (OFDM) modulation technology, and data are modulated on a subcarrier in frequency domain and then is transformed to time domain and added with a Cyclic Prefix (CP) to form a complete time-domain transmission OFDM symbol. The CP is used to resist symbol interference generated by multiple paths in the time domain and inter-subcarrier interference generated in the frequency domain. There are CPs with two lengths in an LTE/LTE-A system, one is a Normal CP (NCP), and the other is an Extended CP (ECP). The ECP is applied to a scenario with a greater multipath delay spread. Under an NCP condition, a subcarrier spacing is 15 kHz; and under an ECP condition, there are two subcarrier spacings, i.e., 15 kHz and 7.5 kHz.

A signal transmitted in each slot is described with one or more resource grids. A resource grid consists of $N_{RB}^{DL} N_{sc}^{RB}$ subcarriers and $N_{symb}^{DL}$ OFDM symbols, where $N_{RB}^{DL}$ represents the number of Physical Resource Blocks (PRBs) or Resource Blocks (RBs), $N_{sc}^{RB}$ represents the number of subcarriers in the RBs, and $N_{symb}^{DL}$ represents the number of the OFDM symbols in the slot. Table 2 shows PRB parameters, and the number of OFDM symbols and the number of subcarriers on an RB are shown in Table 2. Table 3 shows OFDM symbol parameters, and lengths of the CPs are shown in Table 3.

TABLE 2

| Configuration | | $N_{sc}^{RB}$ | $N_{symb}^{DL}$ |
|---|---|---|---|
| NCP | $\Delta f = 15$ kHz | 12 | 7 |
| ECP | $\Delta f = 15$ kHz | | 6 |
| | $\Delta f = 7.5$ kHz | 24 | 3 |

TABLE 3

| Configuration | | CP length $^{NCP, l}$ |
|---|---|---|
| NCP | $\Delta f = 15$ kHz | 160 for l = 0 |
| | | 144 for l = 1, 2, ..., 6 |
| ECP | $\Delta f = 15$ kHz | 512 for l = 0, 1, ..., 5 |
| | $\Delta f = 7.5$ kHz | 1024 for l = 0, 1, 2 |

The number $N_{RB}^{DL}$ of the PRBs is determined by a downlink transmission bandwidth configured by a cell, and has a minimum value of 6 and a maximum value of 110.

The same PRB on two continuous slots on the same subframe is referred to as a PRB pair.

FIG. 3 is a schematic diagram of a downlink resource grid. As shown in FIG. 3, each unit in the resource grid is referred to as a Resource Element (RE), and is denoted with an index pair (k, l), where k=0, ..., $N_{RB}^{DL} N_{sc}^{RB}-1$ represents a serial number of a subcarrier in the frequency domain, and l=0, ..., $N_{symb}^{DL}-1$ represents a serial number of an OFDM symbol in the time domain.

An antenna port is defined as a channel through which a symbol transmitted on the antenna port passes, and may be conjectured by a channel through which another symbol transmitted on the same port passes. An antenna port is also defined with a corresponding serial number for distinguishing between antenna ports and indexing of the antenna port.

A downlink physical channel corresponds to a set of REs, and is configured to bear information from an upper layer. Downlink physical channels include: a Physical Downlink Shared Channel (PDSCH), a Physical Multicast Channel (PMCH), a Physical Broadcast Channel (PBCH), a Physical Control Format Indicator Channel (PCFICH), a Physical Downlink Control Channel (PDCCH), a Physical Hybrid Automatic Repeat reQuest Indicator Channel (PHICH) and an Enhanced PDCCH (EPDCCH).

A downlink physical signal corresponds to a set of REs, and is used by a physical layer and not configured to bear upper-layer information. Downlink physical signals include: a Reference Signal (RS), a synchronization signal and a discovery signal.

RSs are also referred to as pilots, and include the following types: Cell-specific Reference Signals (CRSs), a Multimedia Broadcast Single Frequency Network (MBSFN) RSs, UE-specific RSs (Demodulation Reference Signals (DMRSs)), positioning RSs and CSI-RSs, where the UE-specific RSs further include the following two types: UE-specific RSs associated with PDSCH and DMRSs associated with EPDCCH.

A CSI-RS is used for UE to predict a channel state. A CSI-RS transmitted by with Non-Zero Power is referred to as an NZP CSI-RS. Sometimes for avoiding interference, data transmission on some REs on a PDSCH is to be avoided, Zero Power (ZP) transmission of a CSI-RS is used instead, and at this time, the CSI-RS is referred to as a ZP CSI-RS, and a corresponding RE set is referred to as a ZP CSI-RS resource. Sometimes for measuring the interference, ZP transmission of a CSI-RS is used, and at this time, a corresponding RE set is referred to as a CSI-Interference Measurement (CSI-IM) resource.

A CSI-RS configuration is used to indicate an RE mapped by a CSI-RS, i.e., an RE for transmitting the CSI-RS, and a CSI-RS configuration serial number is used to distinguish different CSI-RS configurations. An RE set for transmitting or mapping a CSI-RS under a CSI-RS configuration is referred to as a CSI-RS resource pattern. A CSI-RS subframe configuration is used to indicate a subframe where a CSI-RS is transmitted.

A CSI-RS configuration is a CSI-RS configuration under a certain number of antenna ports, for example, a CSI-RS configuration corresponding to 8 antenna ports and with a configuration serial number 0 (an 8-port CSI-RS config #0). A CSI-RS resource pattern is a CSI-RS resource pattern under a certain number of antenna ports, for example, a CSI-RS resource pattern corresponding to 8 antenna ports and with an index number of 0 (an 8-port CSI-RS resource pattern #0). A configuration serial number is usually an index number.

An RE set for transmitting or mapping CSI-RSs with part of the ports under a CSI-RS configuration is referred to as an RS resource pattern with part of ports, for example, an RS resource pattern with port serial numbers of {15, 16, 17, 18}.

A related technology supports CSI-RSs with 1, 2, 4 or 8 ports, and CSI-RS resource patterns with these numbers of ports are repeated on each PRB pair within a bandwidth range in a transmission subframe.

All RE sets configured as CSI-RS resource patterns with different numbers of ports are the same, that is, all RE sets configured as 2-port CSI-RS resource patterns are equal to all RE sets configured as 4-port CSI-RS resource patterns and equal to all RE sets configured as 8-port CSI-RS resource patterns. For example, for a common CSI-RS configuration condition of a frame structure type 1 and a frame structure type 2, all RE sets configured as CSI-RS resource patterns with different numbers of ports are the same, and the number of REs on a PRB is 40.

FIG. 4 is a resource pattern of a 4-port CSI-RS on an RB pair. FIG. 5 is a resource pattern of an 8-port CSI-RS on an RB pair.

For fully utilizing power and improving channel measurement accuracy, CSI-RSs of various ports are further divided into groups, that is, a group includes CSI-RSs of multiple ports, and there are one or more groups. CSI-RSs of the ports in a group are mapped onto the same set of REs in a code division multiplexing scheme. For example, the number of ports in a group is N, and a CSI-RS sequence is $\{r_0, r_1, \ldots, r_{N-1}\}$; in addition, there is a sequence set $\{w_0^p, w_1^p, \ldots, w_{N-1}^p\}$ with a length of N, where p=K+0, K+1, ..., K+N−1, there are N sequences in the group, and the sequences in the group are mutually orthogonal, that is, $\Sigma_{m=0}^{N-1} w_m^i w_m^j = 0$, where i, j=K+0, ..., K+N−1, and i≠j; the sequence $\{w_0^p, w_1^p, \ldots, w_{N-1}^p\}$ is modulated by the CSI-RS sequence $\{r_0, r_1, \ldots, r_{N-1}\}$ to obtain a CSI-RS sequence $\{r_0 w_0^p, r_1 w_1^p, \ldots, r_{N-1} w_{N-1}^p\}$ corresponding to a port p; and corresponding to the same set of REs, elements in the CSI-RS sequence corresponding to the port p are mapped to the REs in a one-to-one corresponding manner. N is a multiplexing length.

In the related technology, a manner of multiplexing and mapping CSI-RSs between ports to REs is as follows: the ports are divided into groups, for example, totally 4 groups {15, 16}, {17, 18}, {19, 20} and {21, 22}, and the four groups are multiplexed to the REs in a frequency division manner; and within each group, the CSI-RSs of the ports are multiplexed to the REs in the time domain in a code division manner, for example, the CSI-RS of the port 15 and the CSI-RS of the port 16 are multiplexed in the time domain in the code division manner.

A base station notifies UE of information about a CSI-RS through upper-layer signaling, and the information includes: a CSI-RS resource configuration identity, a number of ports for the CSI-RS, CSI-RS configuration and CSI-RS subframe configuration.

A CRS may be configured to not only measure a channel state but also receive estimation about a channel coefficient during demodulation. However, along with increase of the number of ports, an overhead is sharply increased. Therefore, CRS is no longer used to measure channel states when the number of ports is 8, and instead, CSI-RSs which are low in RS density and low in overhead are used. However, along with development of the technology and requirement, technologies applied under a larger number of antenna ports for example, 12 or 16 ports, are to be developed, and measurement over channel states under the larger number of ports is involved. However, the related technology may not support 12 or 16-port CSI-RS transmission. In addition, when the number of the ports is increased to 12 or 16, there may be brought the problems of high overhead, reduction in channel measurement performance, high UE complexity and the like.

SUMMARY

In order to solve the technical problem, embodiments of the disclosure provide a method and apparatus for configuring a CSI-RS, which may support CSI-RS transmission with more than 8 ports.

In order to achieve the technical purpose, the embodiments of the disclosure provide a method for configuring a CSI-RS, which may include that: a base station determines configuration information of a CSI-RS; the base station generates signaling including the configuration information of the CSI-RS; and the base station transmits the signaling including the configuration information of the CSI-RS, wherein the configuration information may include: a number of ports, RS resource pattern information and an inter-CSI-RS-port multiplexing scheme, and when the number of the ports is larger than 1, there may be M candidate RS resource patterns for the CSI-RS, where M is an integer greater than 1.

The embodiments of the disclosure further provide a CSI-RS configuration device, which may include: a determination module, configured to determine configuration information of a CSI-RS; a generation module, configured to generate signaling including the configuration information of the CSI-RS; and a transmission module, configured to transmit the signaling including the configuration information of the CSI-RS, wherein the configuration information may include: a number of ports, RS resource pattern information and an inter-CSI-RS-port multiplexing scheme, and when the number of the ports is larger than 1, there may be M candidate RS resource patterns for the CSI-RS, where M is an integer greater than 1.

In the embodiments of the disclosure, a computer storage medium is further provided, the computer storage medium may store an executable instruction, and the executable instruction may be configured to execute the method for configuring the CSI-RS in the embodiments.

In the embodiments of the disclosure, the base station determines the configuration information of the CSI-RS; the base station generates the signaling including the configuration information of the CSI-RS; and the base station transmits the signaling including the configuration information of the CSI-RS, wherein the configuration information includes: the number of the ports, the RS resource pattern information and the inter-CSI-RS-port multiplexing scheme, and when the number of the ports is larger than 1, there are the M candidate RS resource patterns for the CSI-RS, where M is an integer greater than 1. By the embodiments of the disclosure, CSI-RS transmission with more than 8 (for example, 12 or 16) ports is supported.

By the embodiments of the disclosure, under the condition of providing a larger RS multiplexing factor, an overhead is reduced, channel estimation quality is improved, transmission and receiving complexity is lowered, and meanwhile, CSI-RS transmission with 12 or 16 ports is supported.

DETAILED DESCRIPTION

The embodiments of the disclosure will be described below in combination with the drawings in detail. It is to be understood that the embodiments described below are used to describe and explain the disclosure and not intended to limit the disclosure.

Figure 6:
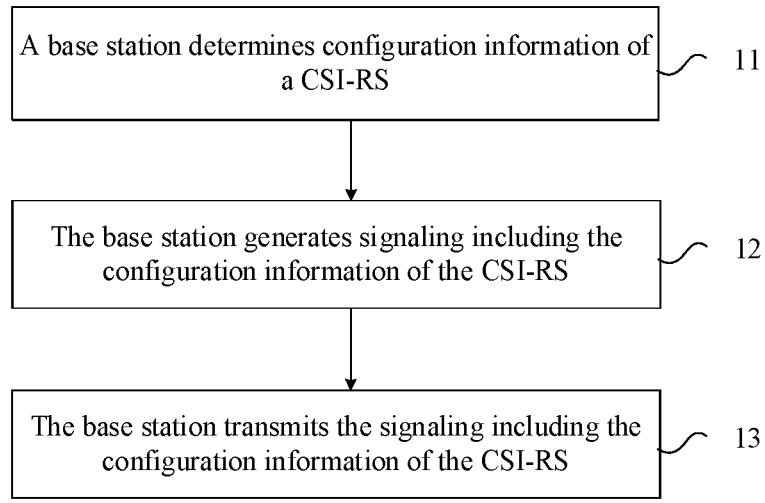
FIG. 6 is a flowchart of a method for configuring a CSI-RS according to an embodiment of the disclosure.

FIG. 6 is a flowchart of a method for configuring a CSI-RS according to an embodiment of the disclosure. As shown in FIG. 6, the method for configuring the CSI-RS provided by the embodiment includes the following operations.

In S11, a base station determines configuration information of a CSI-RS.

In S12, the base station generates signaling including the configuration information of the CSI-RS.

In S13, the base station transmits the signaling including the configuration information of the CSI-RS.

Here, the configuration information includes: a number of ports, RS resource pattern information and an inter-CSI-RS-port multiplexing scheme. When the number of the ports is larger than 1, there are M candidate RS resource patterns for the CSI-RS, where M is an integer greater than 1.

Preferably, the M candidate RS resource patterns include that: when the number of the ports is larger than a first threshold value (TH1), at least two inter-CSI-RS-port multiplexing schemes are used for the M candidate RS resource patterns.

Specifically, an RS symbol of a port is transmitted by one port, and data symbols on a PDSCH are transmitted by multiple ports. If an RS symbol of one port is transmitted on an RE, all power on the RE may be used for transmission of the port, and is equivalent to a sum of powers for all ports transmitting data symbols on an RE; and if the power for transmitting an RS symbol by a port is excessively higher than power for transmitting data symbols by the same port, transmission accuracy of the RS symbol may be influenced. A code division multiplexing scheme is used for RS symbols of multiple ports, so that power may be fully utilized, and RS symbol transmission power of each port may be reduced. In the case that the number of the ports is smaller, a smaller code division multiplexing length may be used; in the case that the number of the ports is increased, a larger code division multiplexing length may be used; and in the case that the number of the ports is larger, the number of the ports is split into several groups of a smaller number of ports sometimes, and a smaller code division multiplexing length is used for their RSs. Sometimes for changing a port multiplexing number, a number of time-domain multiplexing OFDM symbols is increased; or, the number of the time-domain multiplexing OFDM symbols is decreased; or, a frequency-domain multiplexing interval is increased; or, the frequency-domain multiplexing interval is decreased.

Preferably, the M candidate RS resource patterns include that: the M candidate RS resource patterns are divided into two sets, a first multiplexing scheme is used for CSI-RS ports in the first pattern set, a second multiplexing scheme is used for CSI-RS ports in the second pattern set, and the first multiplexing scheme is different from the second multiplexing scheme.

Specifically, in the case that a total number of provided ports is kept unchanged, a number of ports in a group is large sometimes, a larger number of REs are occupied for their multiplexing, a large number of REs are required to be occupied, and then a multiplexing scheme with a larger number of OFDM symbols is required to be used or a multiplexing scheme with a decreased frequency-domain interval is used; and a number of ports in a group is small sometimes, a smaller number of REs are occupied for their multiplexing, a smaller number of REs are required to be occupied, and then a multiplexing scheme with a smaller number of OFDM symbols is required to be used or a multiplexing scheme with an increased frequency-domain interval is used.

Specifically, on the other aspect, in the case that the number of the ports is large, an RS resource pattern corresponding to a large code division multiplexing length may be used; and in the case that the number of the ports is large, the RS is split into several RSs with fewer ports sometimes, and an RS resource pattern corresponding to a smaller code division multiplexing length is used for their RSs.

Preferably, the M candidate RS resource patterns include that: the M candidate RS resource patterns are divided into two sets, a first multiplexing scheme is used for CSI-RS ports in the first pattern set, the first multiplexing scheme or a second multiplexing scheme is used for CSI-RS ports in the second pattern set, the first multiplexing scheme is different from the second multiplexing scheme, and the multiplexing scheme used for the CSI-RS ports of the second pattern set is configured via signaling of the base station.

Specifically, in the case that a total number of provided ports is kept unchanged, a number of ports in a group is large sometimes, a larger number of REs are occupied for multiplexing of the ports, a larger number of REs are required to be occupied, and then a multiplexing scheme with a larger number of OFDM symbols is required to be used or a multiplexing scheme with a decreased frequency-domain interval is used; and a number of ports in a group is small sometimes, a smaller number of REs are occupied for multiplexing of the ports, a smaller number of REs are required to be occupied, and then a multiplexing scheme with a smaller number of OFDM symbols is required to be used or a multiplexing scheme with an increased frequency-domain interval is used. For making part of patterns applicable to the condition that the number of the ports in the group is large and also applicable to the condition that the number of the ports in the group is small, the first multiplexing scheme is used for the CSI-RS ports of the first pattern set, and the first multiplexing scheme or the second multiplexing scheme is used for the CSI-RS ports of the second pattern set.

Specifically, on the other aspect, in the case that the number of the ports is large, an RS resource pattern corresponding to a larger code division multiplexing length may be used; and in the case that the number of the ports is large, the RS is split into several RSs with fewer ports sometimes, and an RS resource pattern corresponding to a smaller code division multiplexing length is used. For making part of patterns applicable to the condition that the number of the ports is large and also applicable to the condition of splitting into RSs with the fewer ports, the first multiplexing scheme is used for the CSI-RS ports of the first pattern set, and the first multiplexing scheme or the second multiplexing scheme is used for the CSI-RS ports of the second pattern set.

Preferably, the M candidate RS resource patterns include that: the M candidate RS resource patterns are divided into three sets, a first multiplexing scheme is used for CSI-RS ports of the first pattern set, a second multiplexing scheme is used for CSI-RS ports of the second pattern set, the first multiplexing scheme or the second multiplexing scheme is used for CSI-RS ports of the third pattern set, the first multiplexing scheme is different from the second multiplexing scheme, and the multiplexing scheme used for the CSI-RS ports of the third pattern set is configured via signaling of the base station.

Specifically, in the case that a total number of provided ports is kept unchanged, the number of ports in a group is large sometimes, a larger number of REs are occupied for multiplexing of the ports, a larger number of REs are required to be occupied, and then a multiplexing scheme with a larger number of OFDM symbols is required to be used or a multiplexing scheme with a decreased frequency-domain interval is used; and the number of ports in a group is small sometimes, a smaller number of REs are occupied for multiplexing of the ports, a smaller number of REs are required to be occupied, and then a multiplexing scheme with a smaller number of OFDM symbols is required to be used or a multiplexing scheme with an increased frequency-domain interval is used. For making part of patterns applicable to the condition that the number of the ports in the group is larger and also applicable to the condition that the number of the ports in the group is smaller, the first multiplexing scheme is used for the CSI-RS ports of the first pattern set, the first multiplexing scheme or the second multiplexing scheme is used for the CSI-RS ports of the second pattern set, and the first multiplexing scheme or the second multiplexing scheme is used for the CSI-RS ports of the third pattern set.

Specifically, in the case that the number of the ports is small, a smaller code division multiplexing length may be used; in the case that the number of the ports is increased, a larger code division multiplexing length may be used; and the in the case that the number of the port is larger, the RS is split into several RSs with fewer ports, and a smaller code division multiplexing length is used. Part of patterns are applied to the condition of splitting into several RSs with fewer ports, part of patterns are applied to the condition that the number of the ports is large, and part of patterns are not only applied to the condition of splitting into several RSs with fewer ports but also applied to the condition that the number of the ports is large.

Preferably, the multiplexing scheme is a code division multiplexing scheme.

Preferably, the first code division multiplexing scheme is code division multiplexing with an orthogonal code length of 2, and the second code division multiplexing scheme is code division multiplexing with an orthogonal code length of 4.

Preferably, the M candidate RS resource patterns include that: when the number of the ports is larger than a second threshold value, at least two types of RS densities are used for the M candidate RS resource patterns.

Specifically, there are certain limits made to REs which may be configured to transmit CSI-RSs in a PRB pair. For example, under an NCP condition, the number of REs configured for CSI-RS transmission of a frame structure type 1 and a frame structure type 2 is 40. In the case that the number of the ports is increased and an RS density of each port is kept unchanged, available RS resource patterns are reduced. For example, there are 5 RS resource patterns for 8-port CSI-RSs under a density of one RE in each PRB pair for each port, while there may be merely two RS resource patterns for 16-port CSI-RSs under a density of one RE in each PRB pair for each port. For providing more RS patterns in the case that the number of the ports is larger, a manner of reducing the RS density of the ports may be used. However, under the condition of low channel relevance and frequency-domain relevance, reducing the RS density may influence channel estimation performance, and it may be necessary to reserve resource patterns under higher RS density. Therefore, in the case that the number of the ports is larger, using multiple types of RS densities may not only provide more RS patterns but also ensure channel estimation performance under a complex condition.

Preferably, the M candidate RS resource patterns include that: the M candidate RS resource patterns are divided into two sets, a first type of RS density is used for the first pattern set, a second type of RS density is used for the second pattern set, and the first type of RS density is different from the second type of RS density.

Here, the two pattern sets correspond to two types of RS densities respectively, and may be selected for use according to a practical condition.

Preferably, the M candidate RS resource patterns include that: in an RS resource pattern set, the inter-CSI-RS-port multiplexing scheme uses a code division multiplexing length of 4, and four REs for mapping of each group of code division multiplexed RS symbols are located on two continuous subcarriers.

Specifically, an RS on each port is transmitted by the single port, and for fully utilizing power, power higher than data transmission power on a single port is used to transmit the RS. Since power may still not be fully utilized to transmit an RS under a limit of a peak-to-average ratio of a power device, a code division multiplexing scheme is used. If channel coefficients between REs for code division multiplexing are greatly different, greater interference may be introduced. There are substantially no difference between channel coefficients of adjacent subcarriers, so that REs for code division multiplexing mapping on continuous subcarriers may be selected to solve the problem.

Preferably, the M candidate RS resource patterns include that: a maximum frequency interval of REs on a PRB pair in a pattern of which an RS density is one RE in each PRB pair for each port is less than or equal to the number, which is a third threshold value (TH3), of subcarriers, and the maximum frequency interval is a difference between a highest frequency and a lowest frequency of frequency bands in which the REs are located.

Alternatively, the third threshold value is 9.

Specifically, channel estimation with a CSI-RS requires comparison between channel coefficients of each port, and an excessive frequency interval of REs of the same pattern on the same PRB pair may introduce a phase comparison error between different ports due to a frequency change of a channel. The third threshold value TH3 is 9, so that the REs may be prevented from being simultaneously distributed in the vicinity of a lowest frequency and in the vicinity of a highest frequency of the same RB.

Preferably, the M candidate RS resource patterns include that: a maximum time-domain interval of REs on each RS resource pattern is smaller than a fourth threshold value (TH4), where the maximum time-domain interval is a difference value between a last one and a first one of OFDM symbols in which the REs are located.

Alternatively, the fourth threshold value is 6.

Alternatively, the fourth threshold value is 5.

Specifically, channel estimation with a CSI-RS requires comparison between channel coefficients of each port, and an excessive time interval of REs of the same pattern may introduce a phase comparison error between different ports due to a time change of a channel. The fourth threshold value is 5, so that CSI-RSs of the same pattern may be controlled to use five OFDM symbols at a smallest interval in OFDM symbols for conventional CSI-RS mapping. The fourth threshold value is 6, so that the CSI-RSs of the same pattern may be controlled to use OFDM symbols at largest intervals in the OFDM symbols for conventional CSI-RS mapping.

Preferably, the M candidate RS resource patterns include that: when the number of the ports is 12, in an RS resource pattern set, each RS resource pattern corresponds to an RS resource pattern under a number of ports of 8, moreover, an RS density is two REs in every three PRB pairs for each port, and different RS resource patterns correspond to different 8-port RS resource patterns.

Specifically, when the number of the ports is 12, an RS resource pattern uses an 8-port RS resource pattern, meanwhile, the RS density is decreased, and a larger number of RS resource patterns may be provided compared with adoption of the RS density of one RE in each PRB pair for each port. In addition, for avoiding waste of REs, the RS density of two REs in every three PRB pairs for each port is used.

Preferably, the M candidate RS resource patterns include that: when the number of the ports is 12, in an RS resource pattern set, each RS resource pattern corresponds to an RS resource pattern under a number of ports of 4 and an RS resource pattern under a number of ports of 2 and is on the same two OFDM symbols, an RS density is one RE in every two PRB pairs for each port, and different RS resource patterns correspond to combinations of different RS resource patterns under the number of the ports of 4 and RS resource patterns under the number of the ports of 2.

Specifically, when the number of the ports is 12, an RS resource pattern uses a combination of a 4-port RS resource pattern and a 2-port RS resource pattern, meanwhile, the RS density is decreased, and a larger number of RS resource patterns may be provided compared with adoption of the RS density of one RE in each PRB pair for each port. Using the same two OFDM symbols rather than more OFDM symbols may avoid introduction of a channel estimation error due to an excessive distribution of the RS patterns on the time domain.

Preferably, the M candidate RS resource patterns include that: when the number of the ports is 12, in an RS resource pattern set, each RS resource pattern corresponds to an 8-port RS resource pattern and two 2-port RS resource patterns, moreover, the two RS resource patterns under the two port numbers are located on the same two OFDM symbols and adjacent in frequency domain, an RS density is one RE in each PRB pair for each port, and different RS resource patterns correspond to combinations of different 8-port RS resource patterns and 2-port RS resource patterns.

Specifically, when the number of the ports is 12, an RS resource pattern uses a combination of an 8-port RS resource pattern and two 2-port RS resource patterns, where the two 2-port RS resource patterns may flexibly form multiple combinations to implement multiple port multiplexing schemes.

Preferably, the M candidate RS resource patterns include that: when the number of the ports is 12, in an RS resource pattern set, each RS resource pattern corresponds to two groups of ports, a first code division multiplexing scheme is used for the first group of ports, a second code division multiplexing scheme is used for the second group of ports, and the first code division multiplexing scheme is different from the second code division multiplexing scheme.

Here, different multiplexing schemes are used for the two groups of ports respectively, and the same pattern meets two different multiplexing schemes.

Preferably, the M candidate RS resource patterns include that: in an RS resource pattern set, each RS resource pattern corresponds to two groups of ports, a first code division multiplexing scheme is used for the first group of ports, the first code division multiplexing scheme or a second code division multiplexing scheme is used for the second group of ports, the first code division multiplexing scheme is different from the second code division multiplexing scheme, and the code division multiplexing scheme used for the second group of ports is configured via signaling of the base station.

Specifically, there may be two corresponding code division multiplexing schemes in the same RS pattern, the first code division multiplexing scheme is used for the first group of ports, and the first code division multiplexing scheme or the second code division multiplexing scheme may be used for the second group of ports, so that compatibility of the second group of ports is improved.

Preferably, the M candidate RS resource patterns include that: in an RS resource pattern set, each RS resource pattern corresponds to two groups of ports, a first code division multiplexing scheme or a second code division multiplexing scheme is used for the first group of ports, the first code division multiplexing scheme or the second code division multiplexing scheme is used for the second group of ports, the first code division multiplexing scheme is different from the second code division multiplexing scheme, the code division multiplexing scheme used for the first group of ports is configured via signaling of the base station, and the code division multiplexing scheme used for the second group of ports is configured by the signaling of the base station.

Specifically, there may be two corresponding code division multiplexing schemes in the same RS pattern, the first code division multiplexing scheme or the second code division multiplexing scheme is used for the first group of ports, and the first code division multiplexing scheme or the second code division multiplexing scheme may be used for the second group of ports, so that compatibility of the first group of ports and the second group of ports is improved.

Preferably, the M candidate RS resource patterns include that: in an RS resource pattern set, the inter-CSI-RS-port multiplexing scheme uses a code division multiplexing length of 4, and code division multiplexed RS symbols of each group are mapped to REs on a PRB pair in a 4-port resource pattern.

Specifically, a manner of mapping code division multiplexed RS symbols in a same group to REs is added to map 4 ports in a same group to a 4-port resource pattern to achieve compatibility with a conventional 4-port RS resource pattern.

Preferably, the operation that the base station determines the configuration information of the CSI-RS includes that: when the code division multiplexing length is 4, a first mapping manner or a second mapping manner is used to map at least one group of code division multiplexed RS symbols to REs. The first mapping manner is mapping the code division multiplexed RS symbols onto continuous subcarriers, the second mapping manner is mapping the code division multiplexed RS symbols onto discontinuous subcarriers and the manner of mapping the group of the code division multiplexed RS symbols to the REs is configured via signaling of the base station.

Specifically, the first mapping manner may achieve a channel estimation performance gain for code division multiplexing, and the second mapping manner does not require continuity of the subcarriers, has higher mapping flexibility, and may be compatible with a conventional 4-port RS pattern. The manner of mapping the code division multiplexed RS symbols in a same group to the REs is notified via the signaling to meet a requirement of a practical scenario.

Preferably, the M candidate RS resource patterns include that: the M candidate RS resource patterns are divided into two sets, in a first pattern set, a first mapping manner is used to map code division multiplexed RS symbols in a same group to REs, and in a second pattern set, a second mapping manner is used to map code division multiplexed RS symbols in a same group to REs, and the first mapping manner is different from the second mapping manner.

The two sets correspond to different manners of mapping the RS symbols to the REs respectively to meet different requirements.

Preferably, the operation that the base station determines the configuration information of the CSI-RS includes that: when the inter-CSI-RS-port multiplexing scheme uses the code division multiplexing length of 4 and the ports are grouped for code division multiplexing, a port grouping manner is configured via signaling of the base station, the port grouping manner including two port grouping manners.

Specifically, there are two port grouping manners for the ports to meet different grouping requirements, and notification with the signaling may facilitate use of different port grouping manners according to the requirement of the practical scenario.

Preferably, the M candidate RS resource patterns include that: the M candidate RS resource patterns are divided into two sets, a first port grouping manner is used for CSI-RS ports in the first pattern set, a second port grouping manner is used for CSI-RS ports in the second pattern set, and the first port grouping manner is different from the second port grouping manner.

The two sets correspond to different port grouping manners respectively to meet different requirements.

Figure 7:
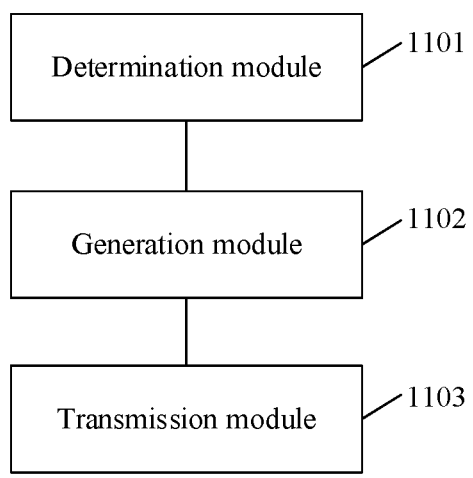
FIG. 7 is a schematic diagram of a device for configuring a CSI-RS according to an embodiment of the disclosure.

FIG. 7 is a schematic diagram of a device for configuring a CSI-RS according to an embodiment of the disclosure. As shown in FIG. 7, the device for configuring the CSI-RS provided by the embodiment is arranged at a base station, and includes: a determination module 1101, a generation module 1102 and a transmission module 1103, wherein the determination module 1101 is arranged to determine configuration information of a CSI-RS; the generation module 1102 is configured to generate signaling including the configuration information of the CSI-RS; and the transmission module 1103 is configured to transmit the signaling including the configuration information of the CSI-RS, wherein the configuration information includes: a number of ports, RS resource pattern information and an inter-CSI-RS-port multiplexing scheme; and when the number of the ports is larger than 1, there exist M candidate RS resource patterns for the CSI-RS, where M is an integer greater than 1.

Preferably, the M candidate RS resource patterns include that: when the number of the ports is larger than a first threshold value, at least two inter-CSI-RS-port multiplexing schemes are used for the M candidate RS resource patterns.

Preferably, the M candidate RS resource patterns include that: the M candidate RS resource patterns are divided into two sets, a first multiplexing scheme is used for CSI-RS ports of the first pattern set, a second multiplexing scheme is used for CSI-RS ports of the second pattern set, and the first multiplexing scheme is different from the second multiplexing scheme.

Preferably, the M candidate RS resource patterns include that: the M candidate RS resource patterns are divided into two sets, a first multiplexing scheme is used for CSI-RS ports of the first pattern set, the first multiplexing scheme or a second multiplexing scheme is used for CSI-RS ports of the second pattern set, the first multiplexing scheme is different from the second multiplexing scheme, and the multiplexing scheme used for the CSI-RS ports of the second pattern set is configured via signaling of a base station.

Preferably, the M candidate RS resource patterns include that: the M candidate RS resource patterns are divided into three sets, a first multiplexing scheme is used for CSI-RS ports of the first pattern set, a second multiplexing scheme is used for CSI-RS ports of the second pattern set, the first multiplexing scheme or the second multiplexing scheme is used for CSI-RS ports of the third pattern set, the first multiplexing scheme is different from the second multiplexing scheme, and the multiplexing scheme used for the CSI-RS ports of the third pattern set is configured via signaling of the base station.

Preferably, the multiplexing scheme is a code division multiplexing scheme.

Preferably, the first code division multiplexing scheme is code division multiplexing with an orthogonal code length of 2, and the second code division multiplexing scheme is code division multiplexing with an orthogonal code length of 4.

Preferably, the M candidate RS resource patterns include that: when the number of the ports is larger than a second threshold value, at least two types of RS densities are used for the M candidate RS resource patterns.

Preferably, the M candidate RS resource patterns include that: the M candidate RS resource patterns are divided into two sets, a first type of RS density is used for the first pattern set, a second type of RS density is used for the second pattern set, and the first type of RS density is different from the second type of RS density.

Preferably, the M candidate RS resource patterns include that: in an RS resource pattern set, the inter-CSI-RS-port multiplexing scheme uses a code division multiplexing length of 4, and four REs for mapping of code division multiplexed RS symbols of each group are located on two continuous subcarriers.

Preferably, the M candidate RS resource patterns include that: a maximum frequency interval of REs on a PRB pair in a pattern of which an RS density is one RE in each PRB pair for each port is less than or equal to the number, which is a third threshold value, of subcarriers, and the maximum frequency interval is a difference between a highest frequency and a lowest frequency of frequency bands in which the REs are located.

Alternatively, the third threshold value is 9.

Preferably, the M candidate RS resource patterns include that: a maximum time-domain interval of REs on each RS resource pattern is smaller than a fourth threshold value, wherein the maximum time-domain interval is a difference value between a last one and a first one of OFDM symbols in which the REs are located.

Alternatively, the fourth threshold value is 6.

Alternatively, the fourth threshold value is 5.

Preferably, the M candidate RS resource patterns include that: when the number of the ports is 12, in an RS resource pattern set, each RS resource pattern corresponds to an RS resource pattern under a number of ports of 8, moreover, an RS density is two REs in every three PRB pairs for each port, and different RS resource patterns correspond to different RS resource patterns under the number of the ports of 8.

Preferably, the M candidate RS resource patterns include that: when the number of the ports is 12, in an RS resource pattern set, each RS resource pattern corresponds to an RS resource pattern under a number of ports of 4 and an RS resource pattern under a number of ports of 2 and is on the same two OFDM symbols, an RS density is one RE in every two PRB pairs for each port, and different RS resource patterns correspond to combinations of different RS resource patterns under the number of the ports of 4 and RS resource patterns under the number of the ports of 2.

Preferably, the M candidate RS resource patterns include that: when the number of the ports is 12, in an RS resource pattern set, each RS resource pattern corresponds to an RS resource pattern under a number of ports of 8 and two RS resource patterns under a number of ports of 2, moreover, the two RS resource patterns under the two port numbers are located on the same two OFDM symbols and adjacent on a frequency domain, an RS density is one RE in each PRB pair for each port, and different RS resource patterns correspond to combinations of different RS resource patterns under the number of the ports of 8 and RS resource patterns under the number of the ports of 2.

Preferably, the M candidate RS resource patterns include that: when the number of the ports is 12, in an RS resource pattern set, each RS resource pattern corresponds to two groups of ports, a first code division multiplexing scheme is used for the first group of ports, a second code division multiplexing scheme is used for the second group of ports, and the first code division multiplexing scheme is different from the second code division multiplexing scheme.

Preferably, the M candidate RS resource patterns include that: in an RS resource pattern set, each RS resource pattern corresponds to two groups of ports, a first code division multiplexing scheme is used for the first group of ports, the first code division multiplexing scheme or a second code division multiplexing scheme is used for the second group of ports, the first code division multiplexing scheme is different from the second code division multiplexing scheme, and the code division multiplexing scheme used for the second group of ports is configured via signaling of the base station.

Preferably, the M candidate RS resource patterns include that: in an RS resource pattern set, each RS resource pattern corresponds to two groups of ports, a first code division multiplexing scheme or a second code division multiplexing scheme is used for the first group of ports, the first code division multiplexing scheme or the second code division multiplexing scheme is used for the second group of ports, the first code division multiplexing scheme is different from the second code division multiplexing scheme, the code division multiplexing scheme used for the first group of ports is configured via signaling of the base station, and the code division multiplexing scheme used for the second group of ports is configured by the signaling of the base station.

Preferably, the M candidate RS resource patterns include that: in an RS resource pattern set, the inter-CSI-RS-port multiplexing scheme uses a code division multiplexing length of 4, and code division multiplexed RS symbols of each group are mapped to REs on a PRB pair in a resource pattern under the number of the ports of 4.

Preferably, that the determination module is configured to determine the configuration information of the CSI-RS includes that: when the code division multiplexing length is 4, a first mapping manner or a second mapping manner is used to map at least one group of code division multiplexed RS symbols to REs, the first mapping manner being mapping the code division multiplexed RS symbols onto continuous subcarriers, the second mapping manner being mapping the code division multiplexed RS symbols onto discontinuous subcarriers and the manner for mapping the code division multiplexed RS symbols of the group to the REs being configured via signaling of the base station.

Preferably, the M candidate RS resource patterns include that: the M candidate RS resource patterns are divided into two sets, in a first pattern set, a first mapping manner is used to map code division multiplexed RS symbols in a same group to REs, and in a second pattern set, a second mapping manner is used to map code division multiplexed RS symbols in a same group to REs, and the first mapping manner is different from the second mapping manner.

Preferably, that the determination module is configured to determine the configuration information of the CSI-RS includes that: when the inter-CSI-RS-port multiplexing scheme uses the code division multiplexing length of 4 and the ports are grouped for code division multiplexing, a port grouping manner is configured via signaling of the base station, the port grouping manner including two types.

Preferably, the M candidate RS resource patterns include that: the M candidate RS resource patterns are divided into two sets, a first port grouping manner is used for CSI-RS ports of the first pattern set, a second port grouping manner is used for CSI-RS ports of the second pattern set, and the first port grouping manner is different from the second port grouping manner.

During a practical application, the transmission module is a communication component with an information transmission capability, for example, a transmitter, and the determination module and the generation module are components with an information processing capability, for example, a processor. However, there are no limits made in the disclosure. The modules may be, for example, combinations of software and/or hardware capable of realizing certain functions.

The disclosure will be described below with multiple specific embodiments.

Embodiment 1

In the embodiment, a base station determines configuration information of a CSI-RS at first, then generates signaling including the configuration information of the CSI-RS and finally transmits the signaling including the configuration information of the CSI-RS. For example, a bits are used to represent port number information, b bits are used to represent RS resource pattern information, and c bits are used to represent an inter-CSI-RS-port multiplexing scheme, where a+b+c=X.

Or, a bits may be used to represent the port number information, and b bits are used to represent a joint code of the RS resource pattern information and the inter-CSI-RS-port multiplexing scheme, where a+b=X.

Or, X bits may be used to represent joint coding of the port number information, the RS resource pattern information and the inter-CSI-RS-port multiplexing scheme.

Or, a bits may be used to represent the port number information, b bits are used to represent the RS resource pattern information, and meanwhile, the RS resource pattern information prompts the inter-CSI-RS-port multiplexing scheme.

Herein, the number of ports may be selected from {1, 2, 4, 8, 12, 16}.

When the number of the ports is larger than 1, there may be M candidate RS resource patterns for the CSI-RS, where M is an integer greater than 1.

Embodiment 2

In the embodiment, when the number of the ports is larger than a first threshold value (TH1), the M candidate RS resource patterns adopt at least two inter-CSI-RS-port code division multiplexing schemes, where M is an integer greater than 1. TH1 may be selected from {4, 8, 12}. The inter-CSI-RS-port code division multiplexing schemes include code division multiplexing with a length of 2, code division multiplexing with a length of 4, code division multiplexing in time domain, code division multiplexing in frequency domain, code division multiplexing in both the time domain and the frequency domain and a combination of the manners.

Embodiment 3

In the embodiment, the M candidate RS resource patterns are divided into two sets, a first multiplexing scheme is used for CSI-RS ports of the first pattern set, a second multiplexing scheme is used for CSI-RS ports of the second pattern ports, and the first multiplexing scheme is different from the second multiplexing scheme, wherein M is an integer greater than 1.

For example, the first code division multiplexing scheme used for the CSI-RS ports of the first pattern sets uses a code division multiplexing length of 2, and the second code division multiplexing scheme used for the CSI-RS ports of the second pattern set uses a code division multiplexing length of 4; or the first code division multiplexing scheme used for the CSI-RS ports of the first pattern set uses the code division multiplexing length of 4, and the second code division multiplexing scheme used for the CSI-RS ports of the second pattern set uses the code division multiplexing length of 2.

Embodiment 4

In the embodiment, the M candidate RS resource patterns are divided into two sets, a first multiplexing scheme is used for CSI-RS ports of the first pattern set, the first multiplexing scheme or a second multiplexing scheme is used for CSI-RS ports of the second pattern set, and the first multiplexing scheme is different from the second multiplexing scheme, where M is an integer greater than 1. The multiplexing scheme used for the CSI-RS ports of the second pattern set is configured via signaling of the base station.

For example, the first code division multiplexing scheme used for the CSI-RS ports of the first pattern sets uses a code division multiplexing length of 2, and the code division multiplexing scheme used for the CSI-RS ports of the second pattern set uses a code division multiplexing length of 2 or 4; or the first code division multiplexing scheme used for the CSI-RS ports of the first pattern set uses the code division multiplexing length of 4, and the code division multiplexing scheme used for the CSI-RS ports of the second pattern set uses the code division multiplexing length of 2 or 4, where the code division multiplexing length used for the CSI-RS ports of the second pattern set is configured via signaling of the base station.

Embodiment 5

In the embodiment, the M candidate RS resource patterns are divided into three sets, a first multiplexing scheme is used for CSI-RS ports of the first pattern set, a second multiplexing scheme is used for CSI-RS ports of the second pattern set, the first multiplexing scheme or the second multiplexing scheme is used for CSI-RS ports of the third pattern set, and the first multiplexing scheme is different from the second multiplexing scheme, where M is an integer greater than 1. The multiplexing scheme used for the CSI-RS ports of the third pattern set is configured via signaling of the base station.

For example, the first code division multiplexing scheme used for the CSI-RS ports of the first pattern sets uses a code division multiplexing length of 2, the second code division multiplexing scheme used for the CSI-RS ports of the second pattern set uses a code division multiplexing length of 4, and the code division multiplexing scheme used for the CSI-RS ports of the third pattern set uses the code division multiplexing length of 2 or 4; or the first code division multiplexing scheme used for the CSI-RS ports of the first pattern set uses the code division multiplexing length of 4, the second code division multiplexing scheme used for the CSI-RS ports of the second pattern set uses the code division multiplexing length of 2, and the code division multiplexing scheme used for the CSI-RS ports of the third pattern set uses the code division multiplexing length of 2 or 4, where the code division multiplexing length used for the CSI-RS ports of the third pattern set is configured via signaling of the base station.

Embodiment 6

In the embodiment, when the number of the ports is larger than a second threshold value (TH2), at least two types of RS densities are used for the M candidate RS resource patterns, where M is an integer greater than 1.

For example, when TH2 is 8 and the number of the ports is 12, there are the following three types of RS densities: one RE in each PRB pair for each port, one RE in every two PRB pairs for each port and two REs in every three PRB pairs for each port; and when TH2 is 8 and the number of the ports is 16, there are the following two types of RS densities: one RE in each PRB pair for each port and one RE in every two PRB pairs for each port.

Embodiment 7

In the embodiment, the M candidate RS resource patterns are divided into two sets, a first type of RS density is used for the first pattern set, a second type of RS density is used for the second pattern set, and the first type of RS density is different from the second type of RS density, where M is an integer greater than 1.

For example, the RS density used for the first pattern set is one RE in each PRB pair for each port, and the RS density used for the second pattern set is one RE in every two PRB pairs for each port; or, the RS density used for the first pattern set is one RE in every two PRB pairs for each port, and the RS density used for the second pattern set is one RE in each PRB pair for each port.

Embodiment 8

In the embodiment, in an RS resource pattern set, the inter-CSI-RS-port multiplexing scheme uses a code division multiplexing length of 4, and four REs for mapping of each group of code division multiplexed RS symbols are located on two continuous subcarriers.

Figure 8:
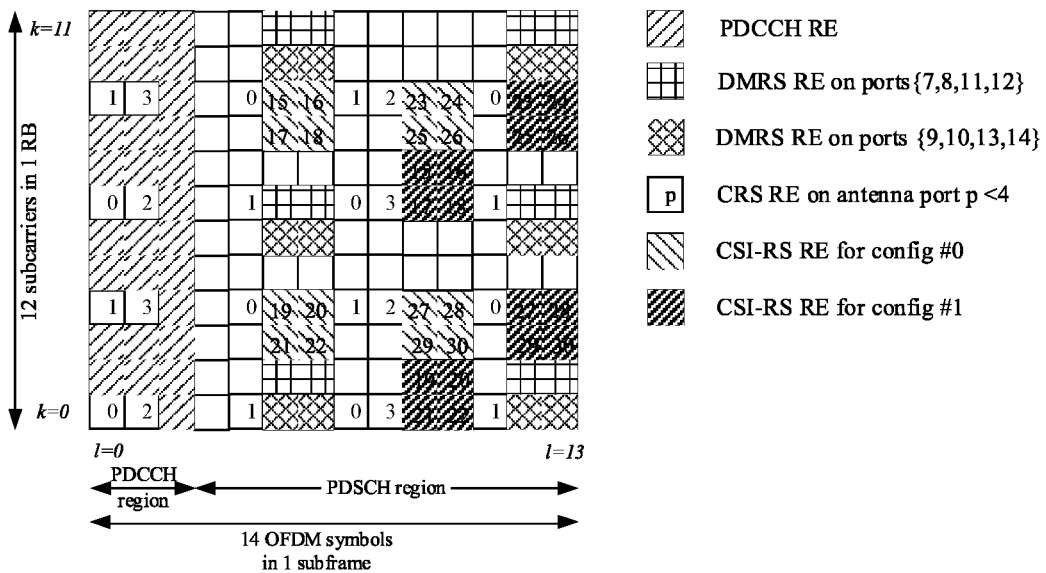
FIG. 8 is a schematic diagram of code division multiplexing of each group of CSI-RSs to four REs of continuous subcarriers in the case of 16 ports.

As shown in FIG. 8, in the case that the number of the ports is 16, CSI-RSs of each group are code division multiplexed to four REs of continuous subcarriers, there are two RS resource patterns in FIG. 8: CSI-RS RE for config #0 and CSI-RS RE for config #1, and in each RS resource pattern, the 16 ports are divided into four groups: {15, 16, 17, 18}, {19, 20, 21, 22}, {23, 24, 25, 26} and {27, 28, 29, 30}, and the four REs for code division multiplexing mapping of the ports of each group are located on two continuous subcarriers.

Figure 9:
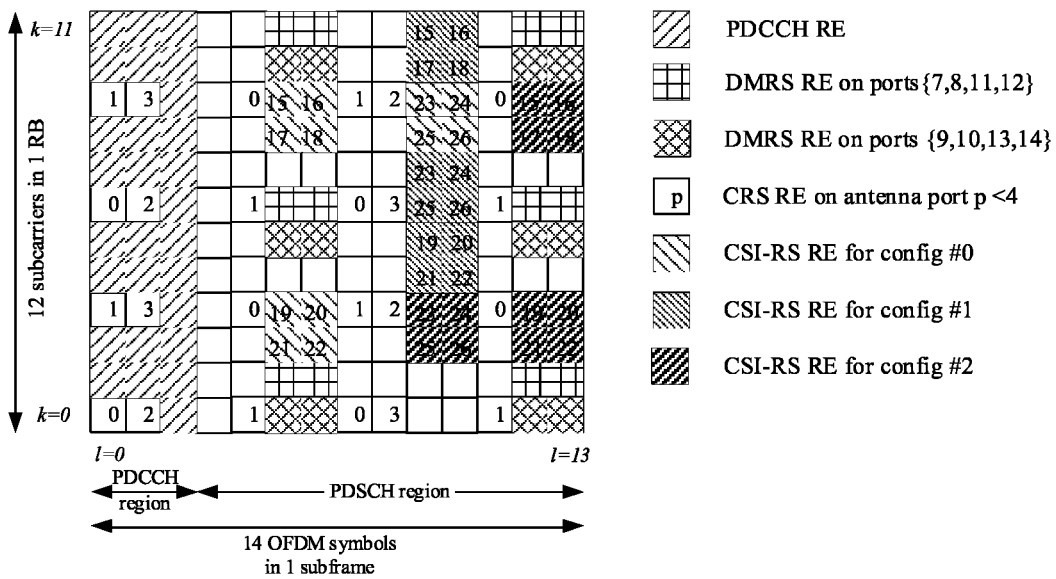
FIG. 9 is a schematic diagram of code division multiplexing of each group of CSI-RSs to four REs of continuous subcarriers in the case of 12 ports.

As shown in FIG. 9, in the case that the number of the ports is 12, each group of the CSI-RSs are code division multiplexed to four REs of continuous subcarriers, there are three RS resource patterns in FIG. 9, i.e., CSI-RS RE for config #0, CSI-RS RE for config #1 and CSI-RS RE for config #2, and in each RS resource pattern, the 12 ports are divided into three groups: {15, 16, 17, 18}, {19, 20, 21, 22} and {23, 24, 25, 26}, and the four REs for code division multiplexing mapping of the ports of each group are located on two continuous subcarriers.

Embodiment 9

In the embodiment, a maximum frequency interval of REs on a PRB pair in a pattern of which an RS density is one RE in each PRB pair for each port is not larger than (namely, less than or equal to) the number, which is a third threshold value (TH3), of subcarriers, that is, the maximum frequency interval is a difference between a highest frequency and a lowest frequency of frequency bands in which the REs are located.

Alternatively, the third threshold value is 9.

Figure 10:
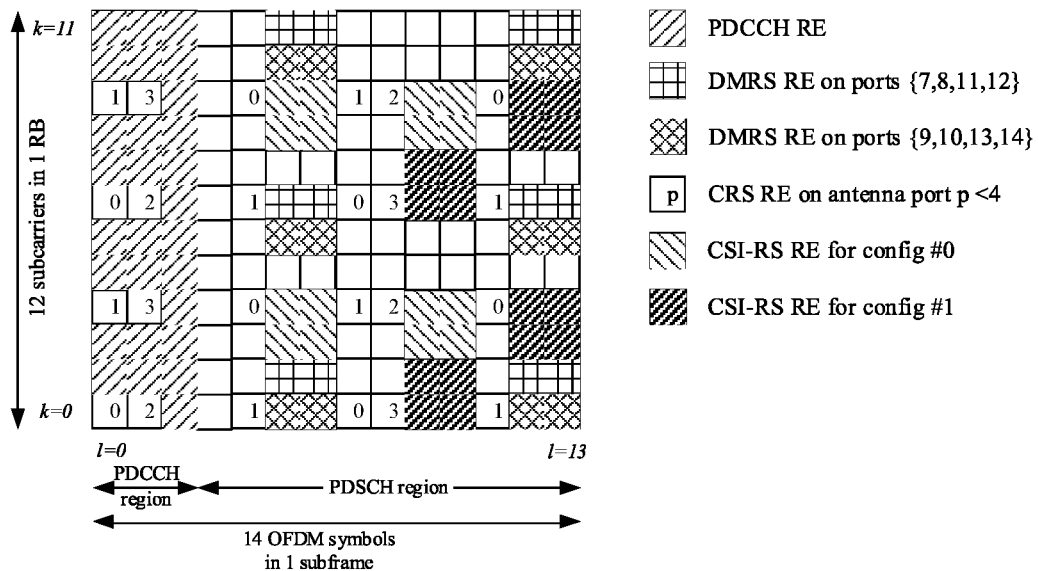
FIG. 10 is a pattern with a maximum frequency interval that is smaller than 9 on a PRB pair in the case that an RS density is one RE in each PRB pair for each port.

FIG. 10 is a pattern with a maximum frequency interval of not larger than 9 on a PRB pair in the case that an RS density is one RE in each PRB pair for each port. In FIG. 10, there are totally two patterns: CSI-RS RE for config #0 and CSI-RS RE for config #1, where a maximum frequency interval on a PRB pair in the pattern 0 is 7 subcarriers, and a maximum frequency interval on a PRB pair in the pattern 1 is 9 subcarriers.

Embodiment 10

In the embodiment, a maximum time-domain interval of REs on each RS resource pattern is smaller than a fourth threshold value (TH4), and the maximum time-domain interval is a difference value between a last one and a first one of OFDM symbols in which the REs are located.

Alternatively, the fourth threshold value is 6.

Figure 11:
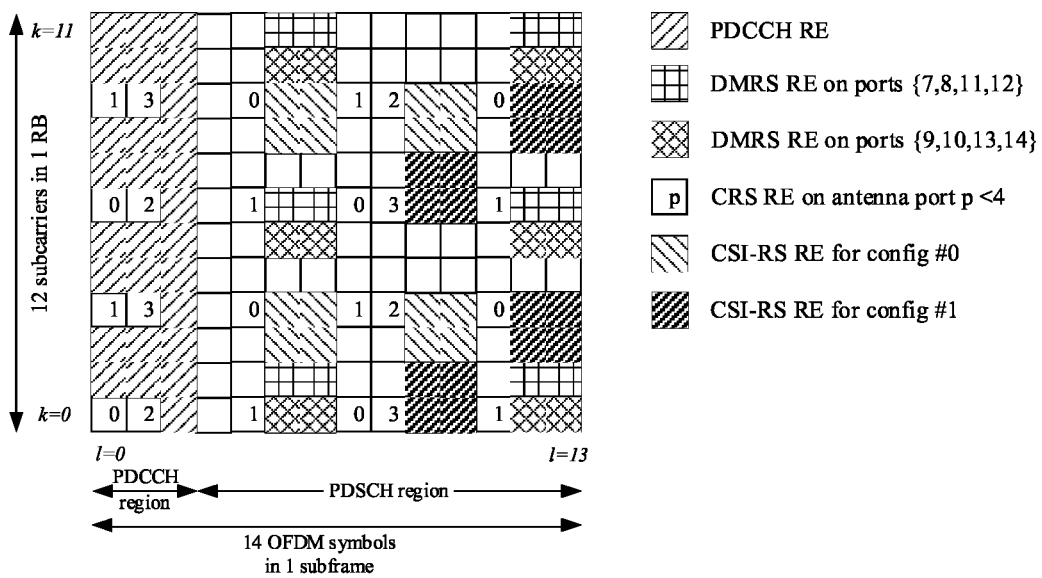
FIG. 11 is a pattern with a maximum time-domain interval that is smaller than 6.

FIG. 11 is a pattern with a maximum time-domain interval smaller than 6. In FIG. 11, there are totally two patterns: CSI-RS RE for config #0 and CSI-RS RE for config #1, a maximum time-domain interval of the pattern 0 is 5, and a maximum time-domain interval of the pattern 1 is 4.

Alternatively, the fourth threshold value is 5.

Figure 12:
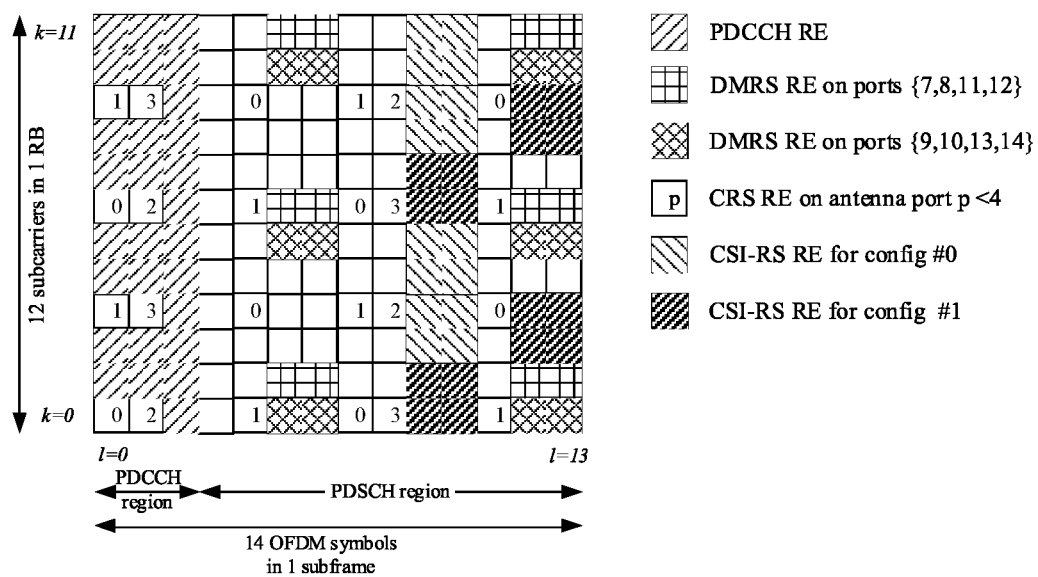
FIG. 12 is a pattern with a maximum time-domain interval that is smaller than 5.

FIG. 12 is a pattern with a maximum time-domain interval smaller than 5. In FIG. 12, there are totally two patterns: CSI-RS RE for config #0 and CSI-RS RE for config #1, a maximum time-domain interval of the pattern 0 is 1, and a maximum time-domain interval of the pattern 1 is 4.

Embodiment 11

In the embodiment, when the number of the ports is 12, in an RS resource pattern set, each RS resource pattern corresponds to an 8-port RS resource pattern, an RS density is two REs in every three PRB pairs for each port, and different RS resource patterns correspond to different RS resource patterns under the number of the ports of 8.

Figure 13:
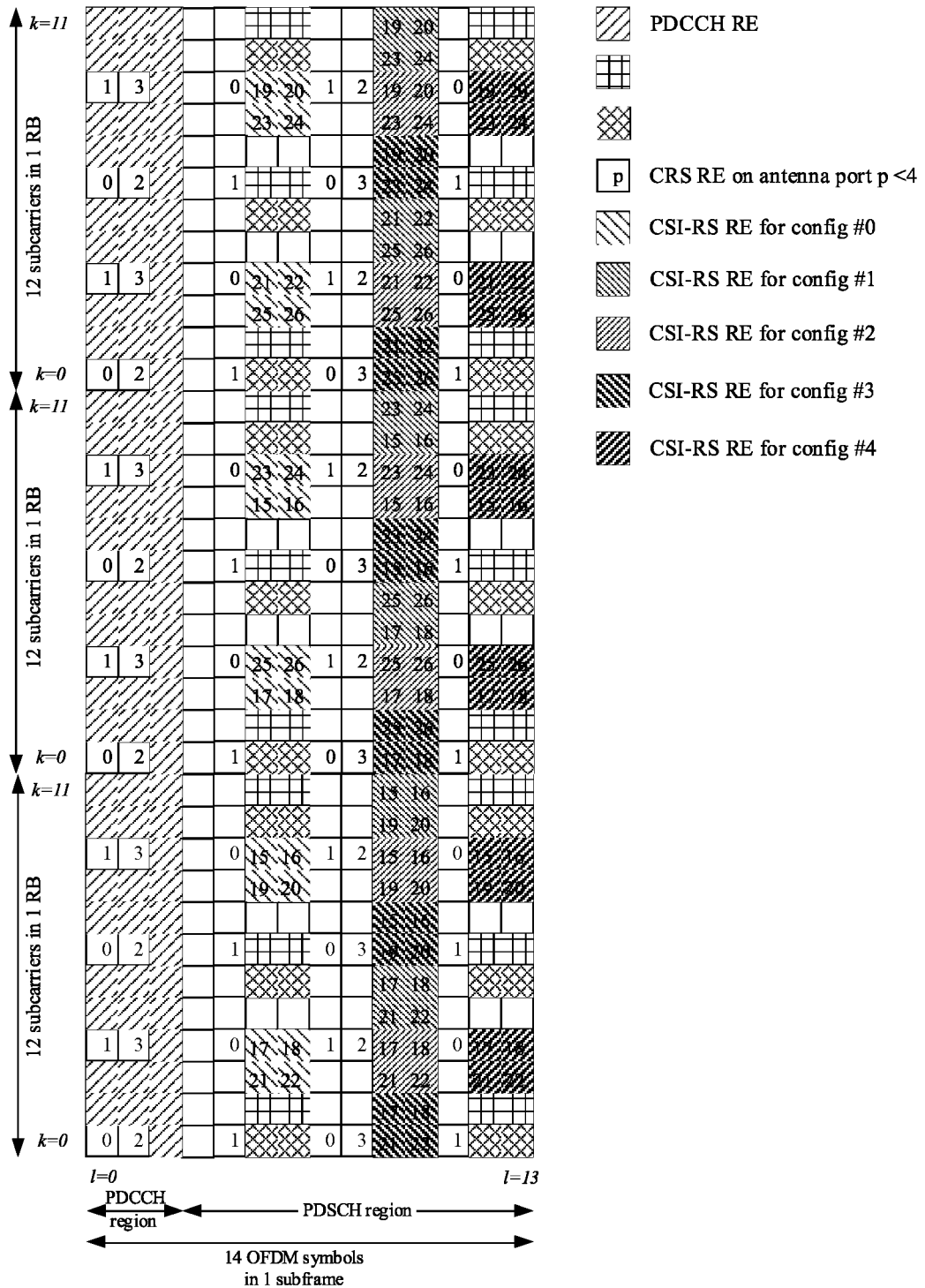
FIG. 13 is a pattern with an RS density of two REs in every three PRB pairs for each port in the case of 12 ports.

FIG. 13 is a pattern with an RS density of two REs in every three PRB pairs for each port in the case of 12 ports. In FIG. 13, there are totally five patterns: CSI-RS RE for config #0, CSI-RS RE for config #1, CSI-RS RE for config #0=2, CSI-RS RE for config #3 and CSI-RS RE for config #4.

Embodiment 12

In the embodiment, when the number of the ports is 12, in an RS resource pattern set, each RS resource pattern corresponds to a 4-port RS resource pattern and a 2-port RS resource pattern and is on the same two OFDM symbols, an RS density is one RE in every two PRB pairs for each port, and different RS resource patterns correspond to different combinations of 4-port RS resource patterns and 2-port RS resource patterns.

Figure 14:
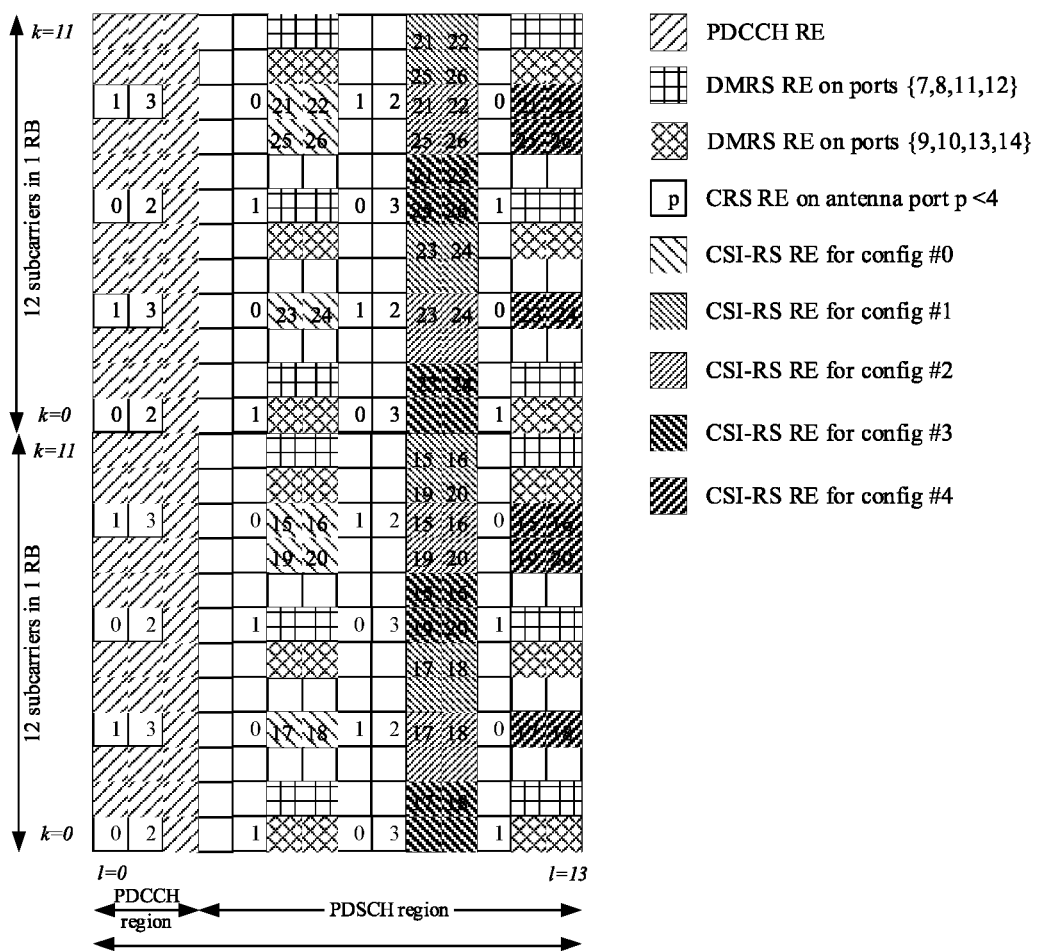
FIG. 14 is a pattern with an RS density of one RE in every two PRB pairs for each port in the case of 12 ports.

FIG. 14 is a pattern with an RS density of one RE in every two PRB pairs for each port in the case of 12 ports. In FIG. 14, there are totally five patterns: CSI-RS RE for config #0, CSI-RS RE for config #1, CSI-RS RE for config #0=2, CSI-RS RE for config #3 and CSI-RS RE for config #4.

Embodiment 13

In the embodiment, when the number of the ports is 12, in an RS resource pattern set, each RS resource pattern corresponds to an 8-port RS resource pattern and two 2-port RS resource patterns, moreover, the RS resource patterns with the two numbers of ports are located on the same two OFDM symbols and adjacent in frequency domain, an RS density is one RE in each PRB pair for each port, and different RS resource patterns correspond to different combinations of 8-port RS resource patterns and 2-port RS resource patterns.

Figure 15:
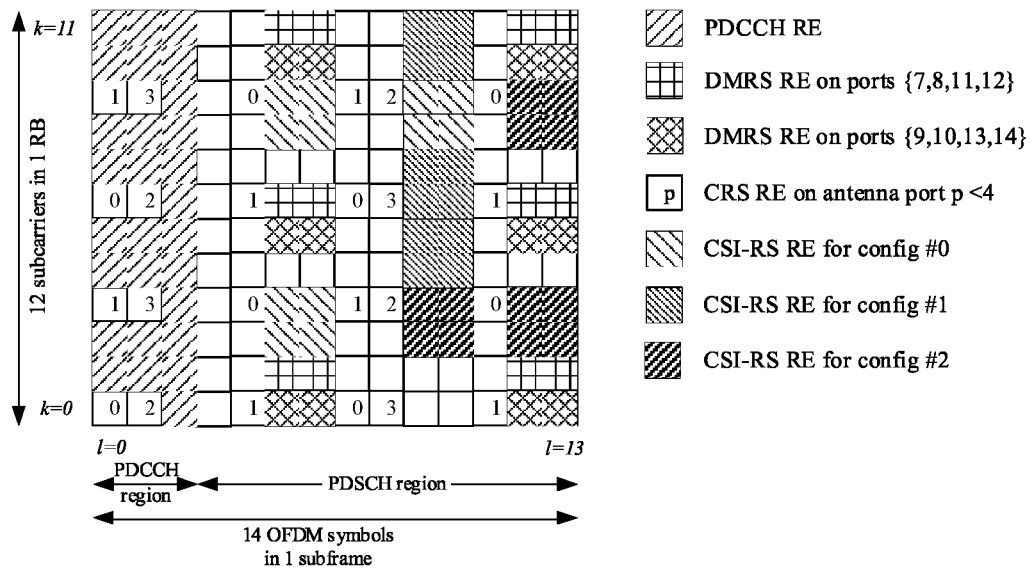
FIG. 15 is a pattern combined by a pattern with 8 ports and two patterns with 2 ports in the case that the number of ports of 12.

FIG. 15 is a pattern formed by a combination of an 8-port pattern and two 2-port patterns in the case that the number of the ports of 12. In FIG. 15, the RS density of the pattern is one RE in each PRB pair for each port.

Embodiment 14

In the embodiment, when the number of the ports is 12, in an RS resource pattern set, each RS resource pattern corresponds to two groups of ports, a first code division multiplexing scheme is used for the first group of ports, a second code division multiplexing scheme is used for the second group of ports, and the first code division multiplexing scheme is different from the second code division multiplexing scheme.

For example, ports {15, 16, 17, 18, 19, 20, 21, 22} form the first group and adopt the first code division multiplexing scheme, and ports {23, 24, 25, 26} form the second group and adopt the second code division multiplexing scheme; or, the ports {15, 16, 17, 18, 19, 20, 21, 22} form the first group and adopt the second code division multiplexing scheme, and the ports {23, 24, 25, 26} form the second group and adopt the first code division multiplexing scheme.

Embodiment 15

In the embodiment, in an RS resource pattern set, each RS resource pattern corresponds to two groups of ports, a first code division multiplexing scheme is used for the first group of ports, the first code division multiplexing scheme or a second code division multiplexing scheme is used for the second group of ports, and the first code division multiplexing scheme is different from the second code division multiplexing scheme. The code division multiplexing scheme used for the second group of ports is configured via signaling of the base station.

For example, a code division multiplexing scheme with a length of 2 is used for the first group of ports, a code division multiplexing scheme with a length of 2 or 4 is used for the second group of ports, and the code division multiplexing scheme used for the second group of ports is configured via signaling of the base station; or, the code division multiplexing scheme with the length of 4 is used for the first group of ports, the code division multiplexing scheme with the length of 4 is used for the second group of ports, and the code division multiplexing scheme used for the second group of ports is configured via signaling of the base station.

Embodiment 16

In the embodiment, in an RS resource pattern set, each RS resource pattern corresponds to two groups of ports, a first code division multiplexing scheme or a second code division multiplexing scheme is used for the first group of ports, the first code division multiplexing scheme or the second code division multiplexing scheme is used for the second group of ports, and the first code division multiplexing scheme is different from the second code division multiplexing scheme. The code division multiplexing scheme used for the first group of ports is configured via signaling of the base station, and the code division multiplexing scheme used for the second group of ports is configured by the signaling of the base station.

For example, a code division multiplexing scheme with a length of 2 or 4 may be used for the first group of ports, the code division multiplexing scheme with the length of 2 or 4 may be used for the second group of ports, and the code division multiplexing schemes used for the first group of ports and the second group of ports are configured via signaling of the base station.

Embodiment 17

In the embodiment, in an RS resource pattern set, the inter-CSI-RS-port multiplexing scheme uses a code division multiplexing length of 4, and each group of code division multiplexed RS symbols are mapped to REs on a PRB pair in a 4-port resource pattern.

Figure 1:
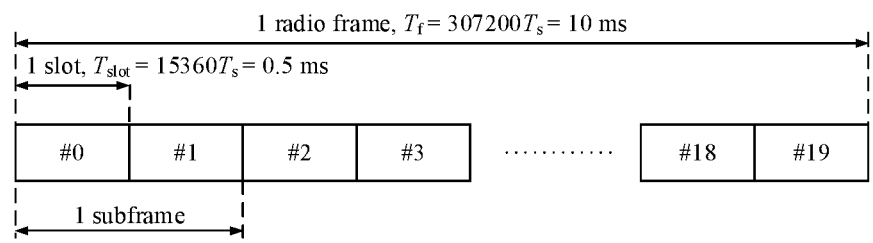
FIG. 1 is a schematic diagram of a frame structure type 1.
Figure 2:
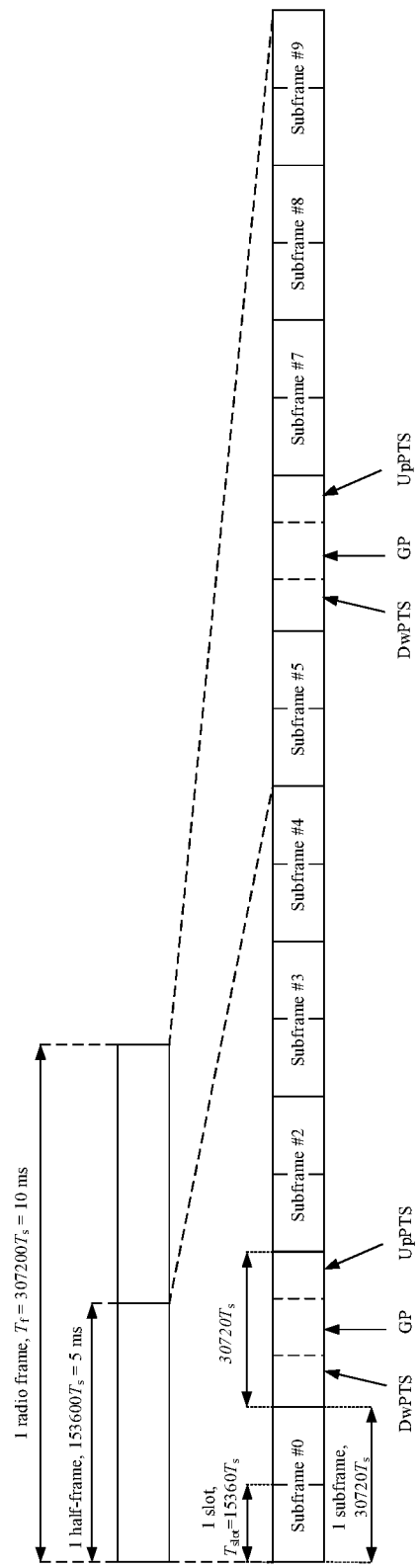
FIG. 2 is a schematic diagram of a frame structure type 2.
Figure 3:
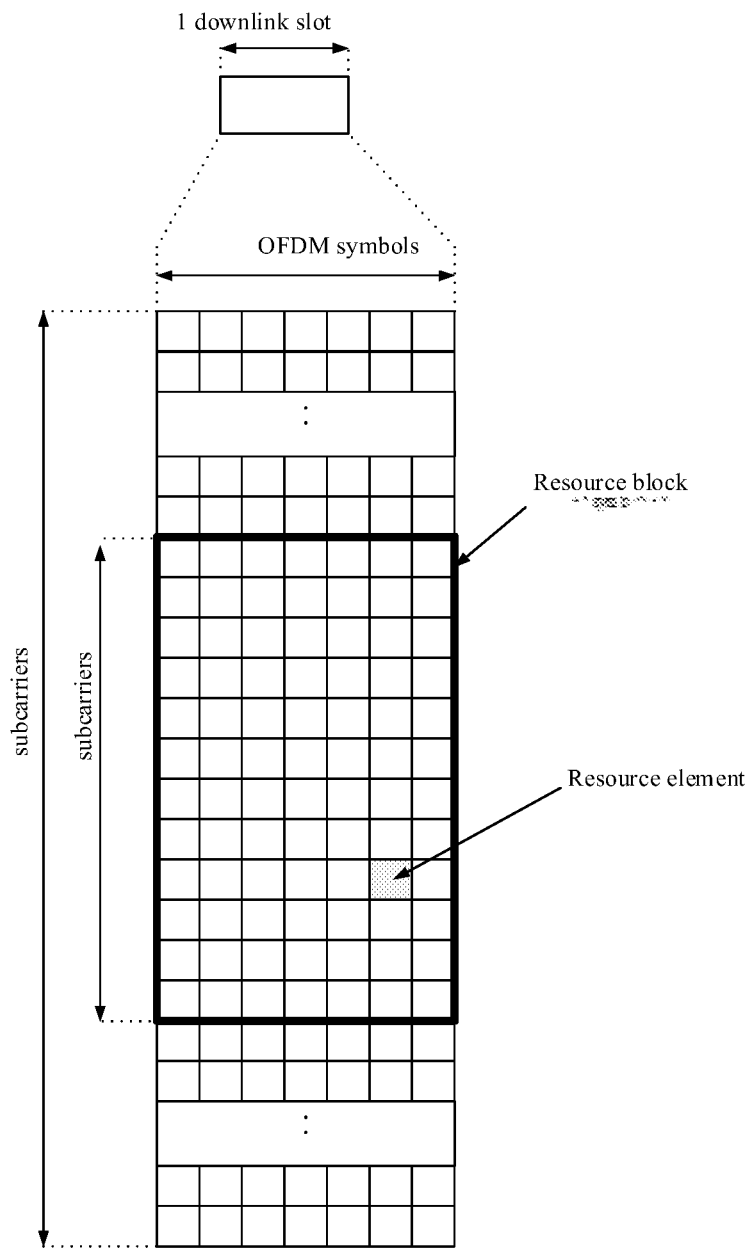
FIG. 3 is a schematic diagram of a downlink resource grid.
Figure 4:
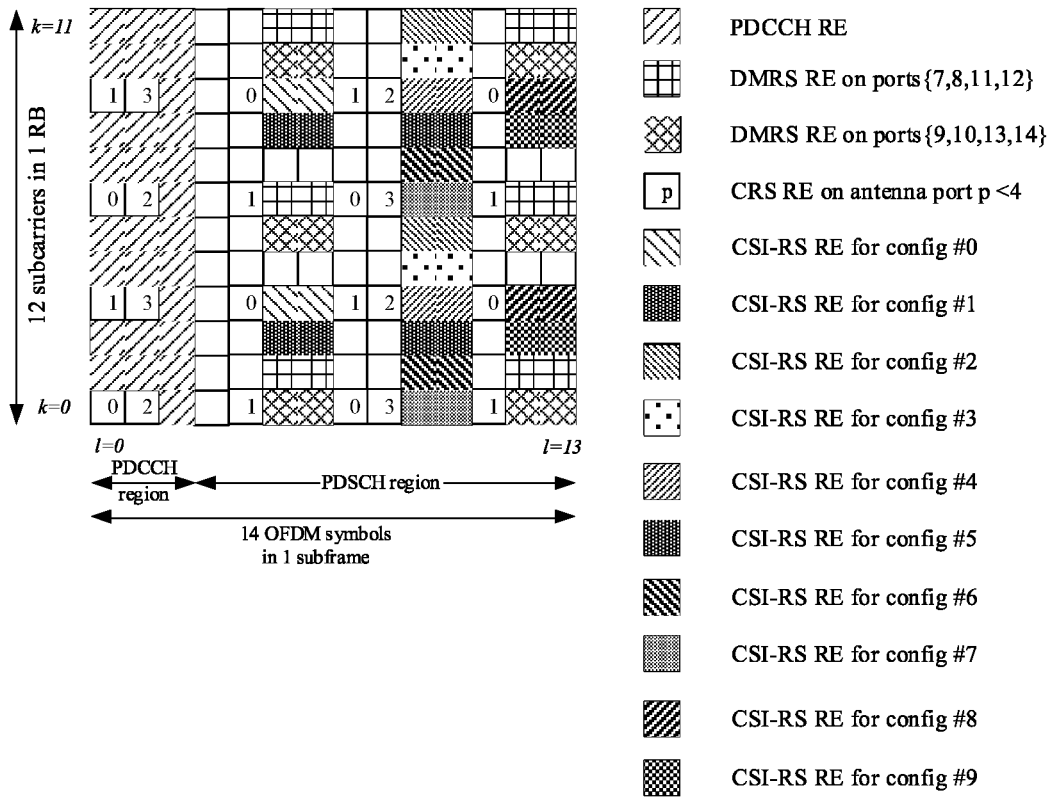
FIG. 4 is a resource pattern of a 4-port CSI-RS on an RB pair.
Figure 5:
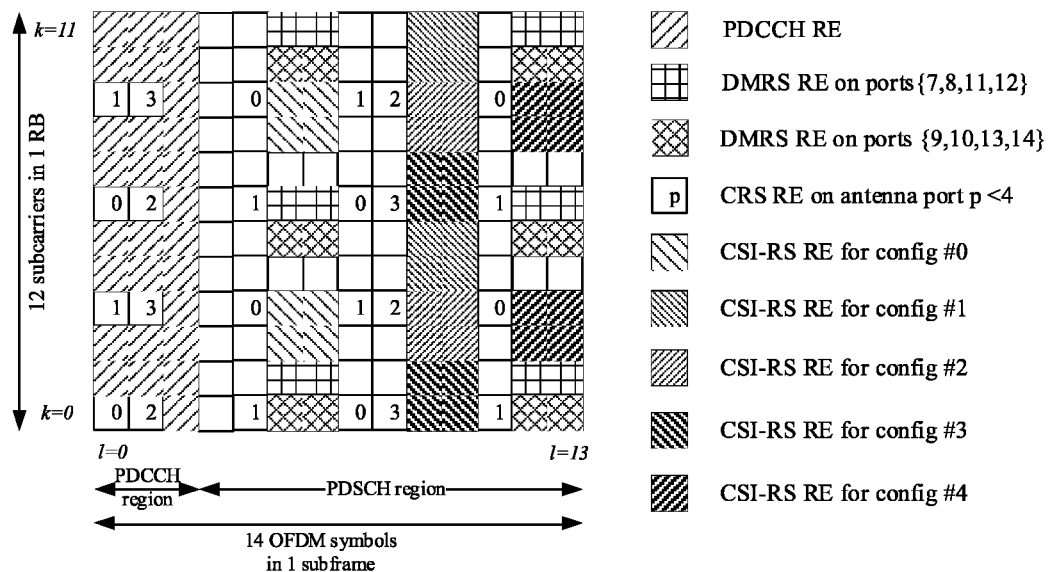
FIG. 5 is a resource pattern of an 8-port CSI-RS 8 on an RB pair.

FIG. 4 is a pattern in the case of 4 ports. There are totally 10 patterns in FIG. 4: CSI-RS RE for config #0, CSI-RS RE for config #1, CSI-RS RE for config #2, CSI-RS RE for config #3, CSI-RS RE for config #4, CSI-RS RE for config #5, CSI-RS RE for config #6, CSI-RS RE for config #7, CSI-RS RE for config #8 and CSI-RS RE for config #9.

Figure 16:
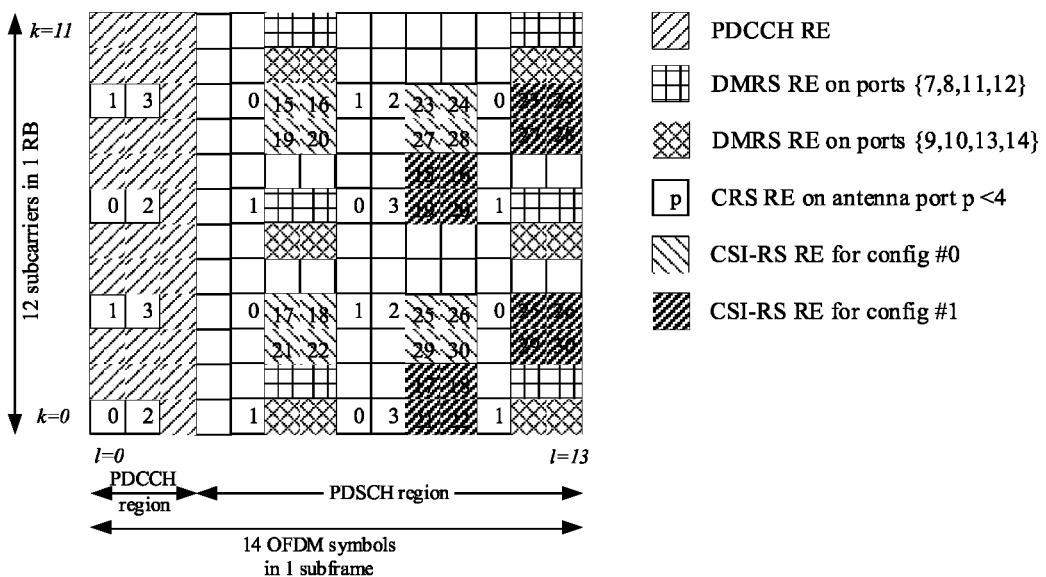
FIG. 16 is mapping of each group of code division multiplexed RS symbols onto REs of a PRB pair in a 4-port resource pattern.

FIG. 16 is mapping of each group of code division multiplexed RS symbols onto REs of a PRB pair in a 4-port resource pattern. In FIG. 16, the ports are grouped as follows: {15, 16, 19, 20}, {17, 18, 21, 22}, {23, 24, 27, 28} and {25, 26, 29, 30}, and the code division multiplexed RS symbols of each group are mapped to REs of a PRB pair in a 4-port resource pattern.

Embodiment 18

In the embodiment, in the case that the code division multiplexing length is 4, a manner for mapping at least one group of code division multiplexed RS symbols to REs is configured via signaling of the base station. There are two types of mapping manners, the first mapping manner is mapping the code division multiplexed RS symbols onto continuous subcarriers, and the second mapping manner is mapping the code division multiplexed RS symbols onto discontinuous subcarriers.

For example, the first mapping manner is mapping the code division multiplexed RS symbols onto two continuous subcarriers, and the second mapping manner is mapping the code division multiplexed RS symbols onto two subcarriers having a frequency-domain difference value of 6 subcarriers.

Embodiment 19

In the embodiment, the M candidate RS resource patterns are divided into two sets. In a first pattern set, code division multiplexed RS symbols in a same group are mapped to REs in a first mapping manner; and in a second pattern set, a second mapping manner is used to map code division multiplexed RS symbols in a same group to REs, and the first mapping manner is different from the second mapping manner, wherein M is an integer greater than 1.

For example, a continuous subcarrier mapping type manner is used for the first pattern set, and a discontinuous subcarrier mapping type manner is used for the second pattern set.

Embodiment 20

In the embodiment, in the case that the code division multiplexing length is 4 and the ports are grouped for code division multiplexing, a type of a port grouping manner is configured via signaling of the base station, and there are two types of port grouping manners.

For example, the first port grouping manner is as follows: {15, 16, 17, 18}, {19, 20, 21, 22}, {23, 24, 25, 26} and {27, 28, 29, 30}; and the second port grouping manner is as follows: {15, 16, 19, 20}, {17, 18, 21, 22}, {23, 24, 27, 28} and {25, 26, 29, 30}.

Embodiment 21

In the embodiment, the M candidate RS resource patterns are divided into two sets, a first port grouping manner is used for CSI-RS ports of the first pattern set, a second port grouping manner is used for CSI-RS ports of the second pattern set, and the first port grouping manner is different from the second port grouping manner, where M is an integer greater than 1.

For example, the first port grouping manner is used for the CSI-RS ports of the first pattern set, and the second port grouping manner is used for the CSI-RS ports of the second pattern set.

The first port grouping manner is as follows: {15, 16, 17, 18}, {19, 20, 21, 22}, {23, 24, 25, 26} and {27, 28, 29, 30}; and the second port grouping manner is as follows: {15, 16, 19, 20}, {17, 18, 21, 22}, {23, 24, 27, 28} and {25, 26, 29, 30}.

A basic principle and main characteristics of the disclosure and advantages of the disclosure are displayed and described above. The disclosure is not limited to the embodiments, the principle of the disclosure is illustrated in the embodiments and the specification, various variations and improvements may further be made to the disclosure without departing from the spirit and scope of the disclosure, and these variations and improvements shall fall within the scope of the disclosure applying for protection.

An embodiment of the disclosure further provides a storage medium. Alternatively, in the embodiment, the storage medium may be configured to store program codes configured to execute the following operations.

In S1, configuration information of a CSI-RS is determined.

In S2, signaling including the configuration information of the CSI-RS is generated.

In S3, the signaling including the configuration information of the CSI-RS is transmitted.

Here, the configuration information may include: a number of ports, RS resource pattern information and an inter-CSI-RS-port multiplexing scheme; and when the number of the ports is larger than 1, there are M candidate RS resource patterns for the CSI-RS, where M is an integer greater than 1.

Alternatively, in the embodiment, the storage medium may include, but not limited to: various media capable of storing program codes, such as a U disk, a Read-Only Memory (ROM), a Random Access Memory (RAM), a mobile hard disk, a magnetic disk or an optical disk.

Alternatively, specific examples in the embodiment may refer to examples described in the abovementioned embodiments and optional implementation modes and will not be elaborated in the embodiment.

Obviously, those skilled in the art should know that each module or each step of the disclosure may be implemented by a universal computing device, and the modules or steps may be concentrated on a single computing device or distributed on a network formed by a plurality of computing devices, and may alternatively be implemented by program codes executable by the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the disclosure is not limited to any specific hardware and software combination.

The above is merely the preferred embodiment of the disclosure and not intended to limit the scope of protection of the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

By the embodiments of the disclosure, under the condition of providing a larger RS multiplexing factor, an overhead is reduced, channel estimation quality is improved, transmission and receiving complexity is lowered, and meanwhile, 12 or 16-port CSI-RS transmission can be supported.

What is claimed is:

1. A method for receiving signaling, comprising:
receiving, by a User Equipment (UE), signaling comprising configuration information of a Channel State Information-Reference Signal (CSI-RS); and
acquiring, by the UE, the configuration information of the CSI-RS from the signaling,
wherein the configuration information comprises: a number of CSI-RS ports, RS resource pattern information and an inter-CSI-RS-port multiplexing scheme, and the RS resource pattern information and the inter-CSI-RS-port multiplexing scheme are jointly-indicated in the signaling comprising the configuration information of the CSI-RS;
wherein when the number of the CSI-RS ports is larger than 1, the CSI-RS has M candidate RS resource patterns, where M is an integer greater than 1;
wherein the M candidate RS resource patterns are divided into a first pattern set and a second pattern set, each of the first pattern set and the second pattern set comprises one or more candidate RS resource patterns, a first multiplexing scheme is used for CSI-RS ports in each candidate RS resource pattern of the first pattern set, a second multiplexing scheme is used for CSI-RS ports in each candidate RS resource pattern of the second pattern set, and the first multiplexing scheme is different from the second multiplexing scheme; and
wherein the first multiplexing scheme is a first code division multiplexing with an orthogonal code length of 2, the second multiplexing scheme is a second code division multiplexing with an orthogonal code length of 4.

2. The method according to claim 1, wherein when the number of the CSI-RS ports is larger than a first threshold value, at least two inter-CSI-RS-port multiplexing schemes are used for the M candidate RS resource patterns.

3. The method according to claim 1, wherein when the number of the CSI-RS ports is larger than a second threshold value, at least two types of RS densities are used for the M candidate RS resource patterns.

4. The method according to claim 1, wherein the M candidate RS resource patterns are divided into two sets, a first type of RS density is used for a first set, a second type of RS density is used for a second set, and the first type of RS density is different from the second type of RS density.

5. The method according to claim 1, wherein in an RS resource pattern set, the inter-CSI-RS-port multiplexing scheme uses a code division multiplexing length of 4, and four Resource Elements (REs), to which each group of code division multiplexed RS symbols are mapped, are located on two continuous subcarriers.

6. The method according to claim 1, wherein the M candidate RS resource patterns are divided into two sets; in a first set, code division multiplexed RS symbols in a same group are mapped to REs in a first mapping manner; in a second set, code division multiplexed RS symbols in a same group are mapped to REs in a second mapping manner, and the first mapping manner is different from the second mapping manner.

7. The method according to claim 1, wherein the M candidate RS resource patterns are divided into two sets, a first port grouping manner is used for CSI-RS ports of a first set, a second port grouping manner is used for CSI-RS ports of the second set, and the first port grouping manner is different from the second port grouping manner.

8. An apparatus for receiving a Channel State Information-Reference Signal (CSI-RS), comprising: a processor; and a memory storing codes, which, when executed by the processor, cause the processor to:
receive signaling comprising configuration information of a Channel State Information-Reference Signal (CSI-RS); and
acquire the configuration information of the CSI-RS from the signaling,
wherein the configuration information comprises: a number of CSI-RS ports, RS resource pattern information and an inter-CSI-RS-port multiplexing scheme, and the RS resource pattern information and the inter-CSI-RS-port multiplexing scheme are jointly-indicated in the signaling comprising the configuration information of the CSI-RS;
wherein when the number of the CSI-RS ports is larger than 1, the CSI-RS has M candidate RS resource patterns, where M is an integer greater than 1;
wherein the M candidate RS resource patterns are divided into a first pattern set and a second pattern set, each of the first pattern set and the second pattern set comprises one or more candidate RS resource patterns, a first multiplexing scheme is used for CSI-RS ports in each candidate RS resource pattern of the first pattern set, a second multiplexing scheme is used for CSI-RS ports in each candidate RS resource pattern of the second pattern set, and the first multiplexing scheme is different from the second multiplexing scheme; and
wherein the first multiplexing scheme is a first code division multiplexing with an orthogonal code length of 2, the second multiplexing scheme is a second code division multiplexing with an orthogonal code length of 4.

9. The apparatus according to claim 8, wherein when the number of the CSI-RS ports is larger than a first threshold value, at least two inter-CSI-RS-port multiplexing schemes are used for the M candidate RS resource patterns.

10. The apparatus according to claim 8, wherein when the number of the CSI-RS ports is larger than a second threshold value, at least two types of RS densities are used for the M candidate RS resource patterns.

11. The apparatus according to claim 8, wherein the M candidate RS resource patterns are divided into two sets, a first type of RS density is used for a first set, a second type of RS density is used for a second set, and the first type of RS density is different from the second type of RS density.

12. The apparatus according to claim 8, wherein in an RS resource pattern set, the inter-CSI-RS-port multiplexing scheme uses a code division multiplexing length of 4, and four Resource Elements (REs), to which each group of code division multiplexed RS symbols are mapped, are located on two continuous subcarriers.

13. The apparatus according to claim 8, wherein the M candidate RS resource patterns are divided into two sets; in a first set, code division multiplexed RS symbols in a same group are mapped to REs in a first mapping manner; in a second set, code division multiplexed RS symbols in a same group are mapped to REs in a second mapping manner, and the first mapping manner is different from the second mapping manner.

14. The apparatus according to claim 8, wherein the M candidate RS resource patterns are divided into two sets, a first port grouping manner is used for CSI-RS ports of a first set, a second port grouping manner is used for CSI-RS ports of the second set, and the first port grouping manner is different from the second port grouping manner.

15. A non-transitory computer-readable storage medium, storing an executable instruction which executes:
   receive signaling comprising configuration information of a Channel State Information-Reference Signal (CSI-RS); and
   acquire the configuration information of the CSI-RS from the signaling,
   wherein the configuration information comprises: a number of CSI-RS ports, RS resource pattern information and an inter-CSI-RS-port multiplexing scheme, and the RS resource pattern information and the inter-CSI-RS-port multiplexing scheme are jointly-indicated in the signaling comprising the configuration information of the CSI-RS;
   wherein when the number of the CSI-RS ports is larger than 1, the CSI-RS has M candidate RS resource patterns, where M is an integer greater than 1;
   wherein the M candidate RS resource patterns are divided into a first pattern set and a second pattern set, each of the first pattern set and the second pattern set comprises one or more candidate RS resource patterns, a first multiplexing scheme is used for CSI-RS ports in each candidate RS resource pattern of the first pattern set, a second multiplexing scheme is used for CSI-RS ports in each candidate RS resource pattern of the second pattern set, and the first multiplexing scheme is different from the second multiplexing scheme; and
   wherein the first multiplexing scheme is a first code division multiplexing with an orthogonal code length of 2, the second multiplexing scheme is a second code division multiplexing with an orthogonal code length of 4.

* * * * *